United States Patent [19]

Nagashima et al.

[11] Patent Number: 4,958,236

[45] Date of Patent: Sep. 18, 1990

[54] IMAGE PROCESSING METHOD AND APPARATUS THEREFOR

[75] Inventors: Nao Nagashima, Yokohama; Hiroyuki Ichikawa, Tokyo; Akihiro Katayama, Kawasaki, all of Japan

[73] Assignee: Canon Kabushiki Kaisha, Tokyo, Japan

[21] Appl. No.: 203,880

[22] Filed: Jun. 8, 1988

[30] Foreign Application Priority Data

| Jun. 11, 1987 | [JP] | Japan | 62-146311 |
| Jun. 11, 1987 | [JP] | Japan | 62-146312 |
| Jun. 11, 1987 | [JP] | Japan | 62-146313 |
| Jun. 11, 1987 | [JP] | Japan | 62-146314 |
| Jun. 11, 1987 | [JP] | Japan | 62-146315 |
| Jun. 11, 1987 | [JP] | Japan | 62-146316 |
| Jun. 11, 1987 | [JP] | Japan | 62-146317 |

[51] Int. Cl.⁵ .......................... H04N 1/40
[52] U.S. Cl. ................... 358/445; 358/450; 358/451; 358/453; 358/296
[58] Field of Search ............ 358/256, 280, 293, 284, 358/445, 450, 453, 451, 296

[56] References Cited

U.S. PATENT DOCUMENTS 4,692,812  9/1987  Hirahara et al. .................... 358/293

Primary Examiner—Edward L. Coles, Sr.
Attorney, Agent, or Firm—Fitzpatrick, Cella, Harper & Scinto

[57] ABSTRACT

In a method of reading an image by dividing it into plural areas and reading these divided areas in succession, continuity is given to the data of plural areas by conducting digitization in overlapping manner over the neighboring areas, in order to avoid formation of a streak at the boundary of the divided areas.

70 Claims, 32 Drawing Sheets

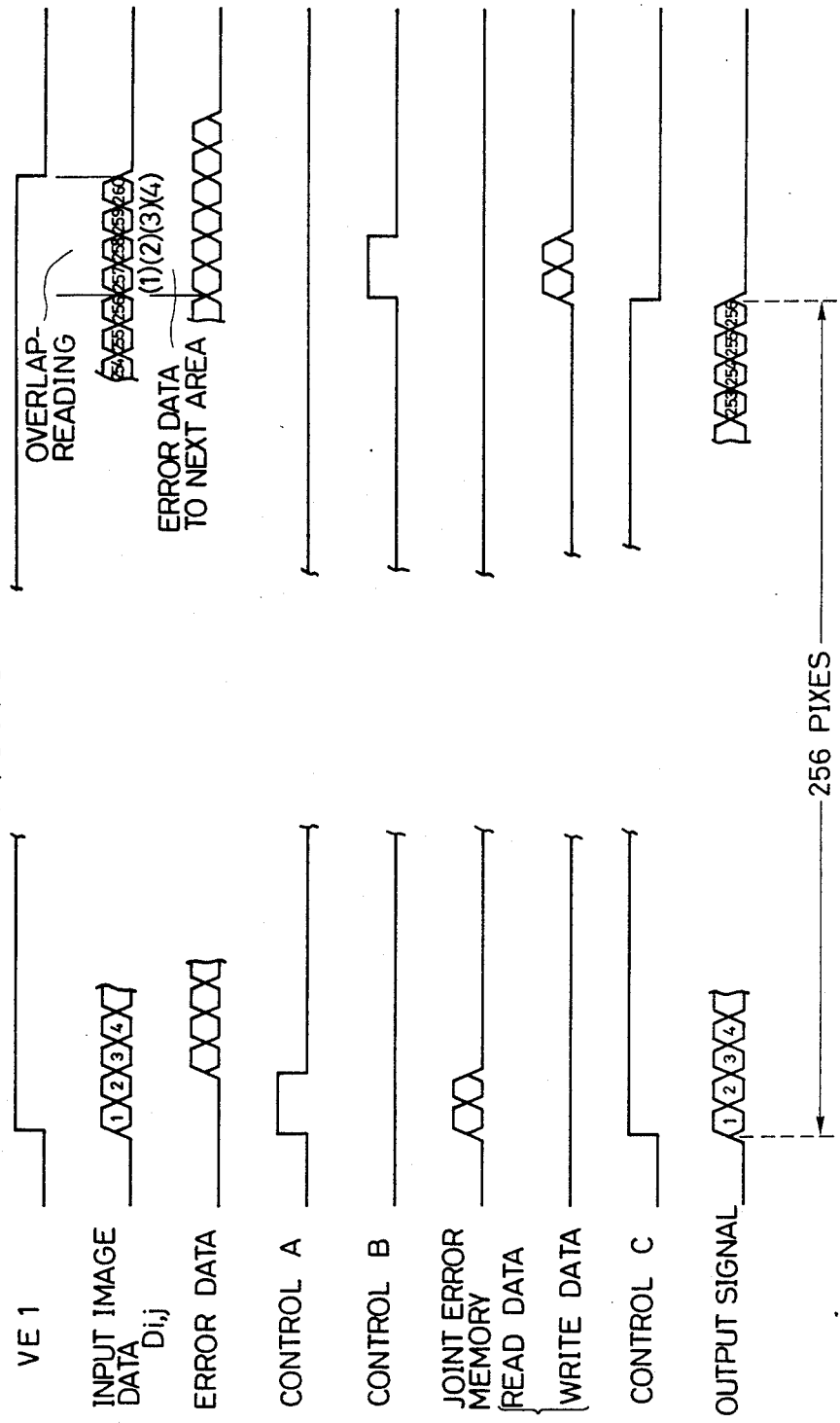

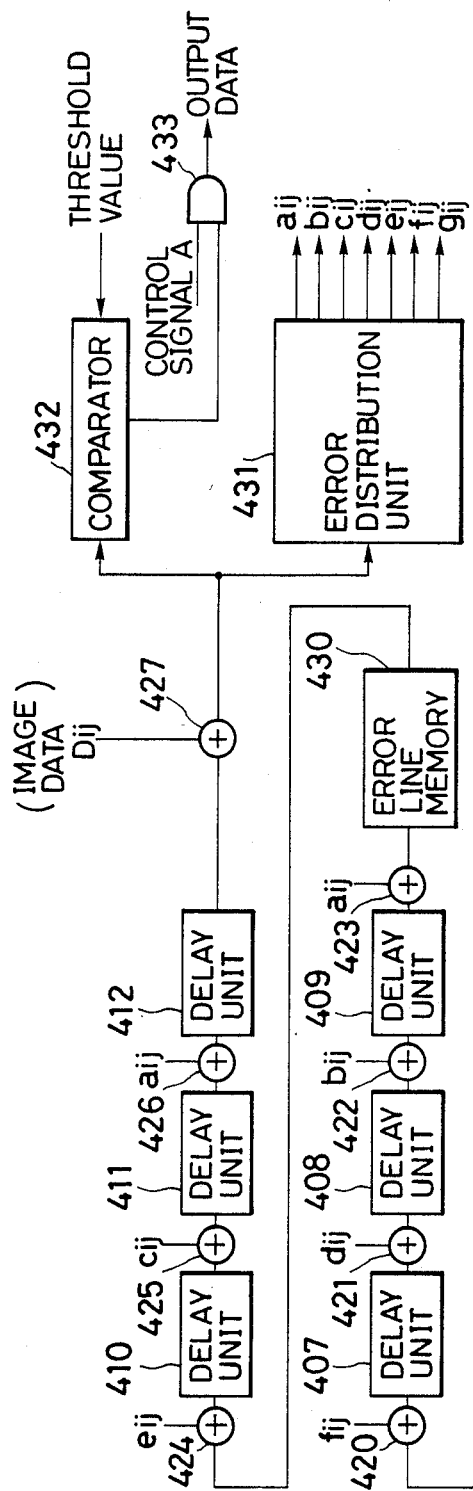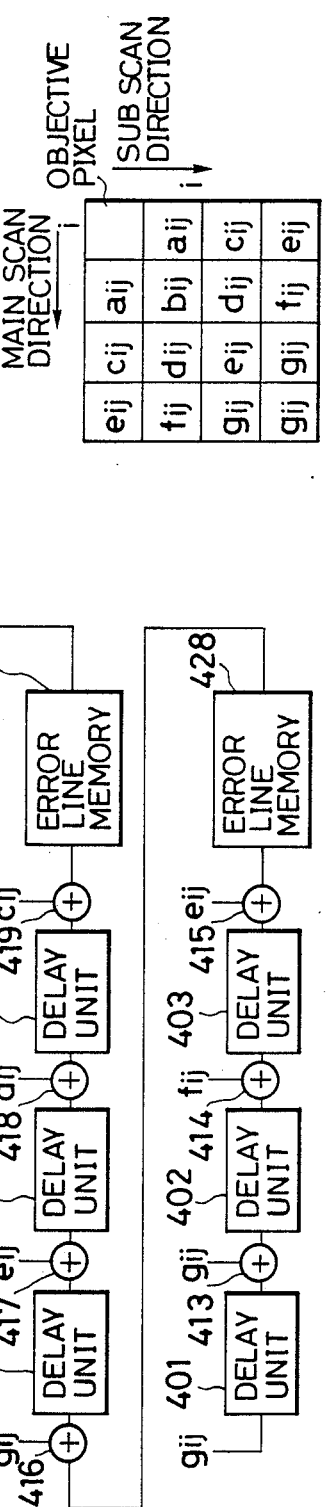
FIG.18A
FIG.18B

ORIGINAL DOCUMENT

PRINT PAPER

FIG. 30
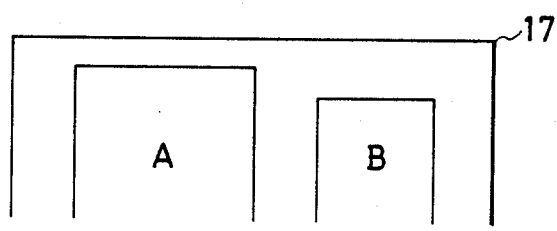
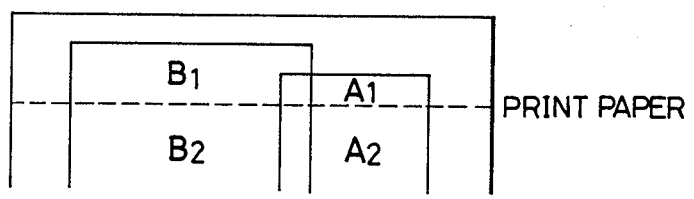

IMAGE PROCESSING METHOD AND APPARATUS THEREFOR

BACKGROUND OF THE INVENTION

1. Field of the Invention

The present invention relates to an image processing method for processing an image in the form of digital signals and an apparatus therefor, and more particularly to an image processing method for pseudo intermediate tone reproduction by digitization of input image and an apparatus therefor.

2. Related Background Art

There are already known printers using a binary recording method, forming a record by printing dots or not, such as laser beam printer (LBP) or ink jet printer. For reproducing an image with intermediate density such as a photograph or a screentone original with a copying apparatus employing such a binary printer, the image data read from such original with intermediate tone are processed by an image processing circuit for pseudo intermediate tone reproduction.

The so-called dither method is widely used as one of such pseudo intermediate tone processing methods.

Said dither method is advantageous in that it is capable of said pseudo intermediate tone reproduction with a simple hardware structure and with a low cost, but is associated with following drawbacks:

(1) a periodic fringe pattern (Moire fringe pattern) is formed on the reproduced image when the original is a screentone image such as a printed image, thus deteriorating the image quality; and (2) when the original contains linetone images or characters, the image quality is deteriorated as the lines are not satisfactorily reproduced.

The drawback (1) can be reduced by a smoothing method (spatial filtering) applied to the read intermediate tone image data, while the drawback (2) can be reduced for example by edge enhancement, but it is difficult to obtain satisfactory reproducibility for various images such as a photograph, an image, a linetone image and characters. Also such processes require a complicated circuitry, deteriorating the inherent advantage of the dither method.

Based on these backgrounds, developments are being made on a so-called error dispersion method as one of such pseudo intermediate tone processing methods.

The error dispersion method, disclosed for example by R. S. Floyd and L. Steinberg in "An Adaptive Algorithm for Spatial Grey Scale", SID 75 Digest, is characterized, in binary digitizing of input image data, by dispersing the density error between the input image data and the output image data into surrounding pixels, thereby conserving the original image density.

Such error dispersion method is superior to the aforementioned dither method in tone reproduction and resolution, but is associated with drawbacks of formation of specific stripe patterns in the uniform density area of the image and of granular noises in the highlight area of the image due to scattered dot formation.

For avoiding such drawbacks, various methods have been proposed for example in the U.S. patent applications Ser. Nos. 137,439, 140,029 and 145,593 and a U.S. patent application filed on May 9, 1988, corresponding to the Japanese Patent Application Nos. 62-121611, 62-121612 and 62-121613.

Such error dispersion method is satisfactorily usable in a copying apparatus utilizing a raster scanning, but will give rise to a following drawback when employed in a serial scanning. A copying apparatus employing such serial scanning is disclosed in the U.S. patent application Ser. No. 798,672.

In serial scanning, the image is read in succession at first in an area (a) and then in an area (b), and is subjected to processing by the error dispersion method. The errors obtained in processing the image of the area (a) are lost when the processing proceeds to the area (b). More specifically, in binary digitizing of the area (b), no carry-over errors from the area (a) are available, so that appropriate binary digitizing of the area (b) cannot be achieved. Consequently a discontinuity appears between the processing of the area (a) and that of the area (b), thus giving rise to a streak or a black line on the boundary.

Also the binary digitizing of 255th and 256th pixels of each line in the area (a) requires error information generated in the binary digitizing of the 1st and 2nd pixels in each line of the area (b). Proper binary digitizing cannot be achieved due to the lack of such error information at the boundary of the areas (a) and (b), and a streak is formed on said boundary.

Now, a further explanation will be provided of the streak formation on the boundary of the processing areas.

Let us consider a case of utilizing a $3 \times 5$ error dispersion matrix shown in FIG. 2A, in which numerals indicate an example of error distribution ratio.

In FIG. 2B it is assumed that each main scanning line has 256 pixels, and that a notation $a(255, 2)$ indicates the 255th pixel in the 2nd scanning line, in the sub scanning direction, of the area (a).

At first let us consider the binary digitizing in an object pixel $a(255, 1)$. The errors generated in the binary digitizing of said pixel are added, as will be apparent from the dispersion matrix shown in FIG. 2A, to pixels $b(1, 1)$, $b(1, 2)$ and $b(1, 3)$.

Also the errors generated in the binary digitizing of a pixel $a(256, 1)$ are added to pixels $b(1, 1)$, $b(1, 2)$, $b(1, 3)$, $b(2, 1)$, $b(2, 2)$ and $b(2, 3)$. Similarly the errors generated in the 255th and 256th pixels in each line of the area (a) are added to the 1st and 2nd pixels of the lines in the area (b).

Then let us consider the binary digitizing of an object pixel $b(1, 1)$. The errors generated in the binary digitizing of said pixel $b(1, 1)$ are added, as will be apparent from FIG. 2A, to pixels $a(255, 2)$, $a(256, 2)$ and $a(256, 3)$.

Also the errors generated in a pixel $b(2, 1)$ are added to pixels $a(256, 2)$ and $a(256, 3)$. Similarly the erros generated in the 1st and 2nd pixels in each line of the area (b) are added to the 255th and 256th pixels of the lines in the area (a).

Therefore, if the error dispersion method is conducted without consideration of the boundary between the areas (a) and (b) as shown in FIG. 1A, the errors generated in the binary digitizing of the 1st and 2nd pixels in each line of the area (b) are not made available in the binary digitizing of the 255th and 256th pixels in each line of the area (a), so that said digitizing of the 255th and 256th pixels cannot be achieved in proper manner. Also the errors generated in the 255th and 256th pixels in each line of the area (a) have to be added to the 1st and 2nd pixels in the lines of the area (b). Thus, the binary digitizing of said 1st and 2nd pixels cannot be achieved in a proper manner unless said errors of the area (a) are retained until the processing of the area (b). In this manner a streak is generated at the boundary of the areas (a) and (b).

SUMMARY OF THE INVENTION

An object of the present invention is to provide an image processing method free from the above-mentioned drawbacks of the prior technology and capable of reproducing an image with high quality and high resolution from any original image, and an apparatus therefor.

Another object of the present invention is to provide an image processing method capable of providing a high-quality image by an improvement over the aforementioned error dispersion method or a minimum average error method, which is in principle equivalent to said error dispersion method, and an apparatus therefor.

Still another object of the present invention is to provide an image processing method capable of high-speed image processing, and an apparatus therefor.

Still another object of the present invention is to provide an image processing method capable of reproducing a satisfactory image with a simple structure, and an apparatus therefor.

Still another object of the present invention is to provide an image processing method enabling digitization with the error dispersion method in a copying apparatus utilizing the serial-scanning method, and an apparatus therefor.

Still another object of the present invention is to provide an image processing method, in case of dividing the original image into plural scanning area and effecting digitization in each of said scanning areas, capable of realizing continuity between neighboring scanning areas, and an apparatus therefor.

Still another object of the present invention is to provide an image processing method, in an image processing for intermediate tone reproduction by dispersing the error generated in said image processing into surrounding pixels, of conducting the image processing in an overlapping manner, including an already processed portion of the image.

Still another object of the present invention is to provide an image processing method, for intermediate tone reproduction by dispersing error data generated in the image processing into surrounding pixels, in which the image processing is conducted in an overlapping manner including an already processed portion of the image and a newly processed portion.

Still another object of the present invention is to provide an image processing method for image reproduction by dispersing the errors generated in the image processing into surrounding pixels, featured by storing error data of an image boundary portion and conducting image processing at such boundary portion based on the thus stored error data.

Still another object of the present invention is to provide an image processing method for intermediate tone reproduction by dispersing error data generated in the image processing into surrounding pixels, featured by storing error data of an image boundary portion for use in the succeeding image processing, and conducting the image processing in an overlapping manner over an already processed image portion and a newly processed image portion.

Still another object of the present invention is to provide an image processing method for effecting, for each of plural areas, dispersion of error data generated in the image processing into surrounding pixels, featured by the use of a dispersion matrix which disperses the errors only in the proceeding direction of image processing but not in the opposite direction.

Still another object of the present invention is to provide an image processing method of dividing the original image into plural scanning areas, storing image signals of each scanning area and processing said image signals by the error dispersion method.

The foregoing and still other objects of the present invention, and the advantages thereof, will become fully apparent from the following description which is to be taken in conjunction with the attached drawings.

BRIEF DESCRIPTION OF THE DRAWINGS

FIG. 16 is a timing chart of the binarizing unit 108 in the second embodiment;

FIG. 18A is a block diagram of the binarizing unit 108 in the third embodiment;

FIG. 18B is a view of the error dispersion matrix in the third and fourth embodiments;

FIGS. 28, 29 and 30 are views showing examples of signal output requiring image jointing information.

DETAILED DESCRIPTION OF THE PREFERRED EMBODIMENTS

At first there will be explained the principle of resolving the streak formation at the boundary between the scanning areas.

Figure 2A:
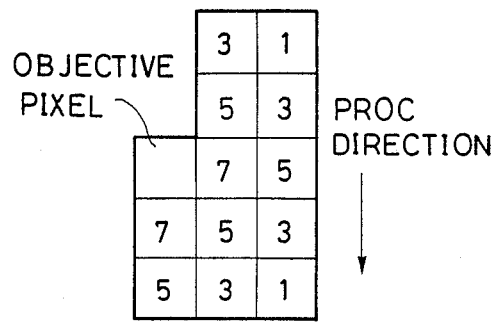
FIGS. 2A and 2B are views showing the draw-back to be resolved by the present invention.
Figure 2B:
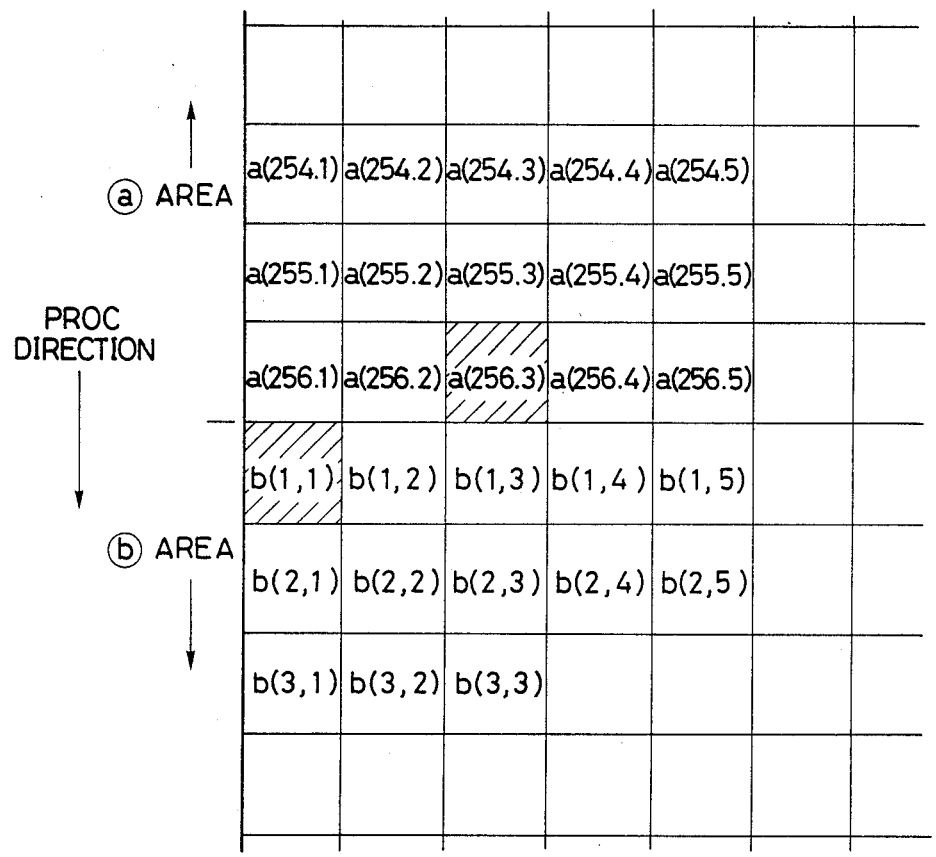
Figure 3A:
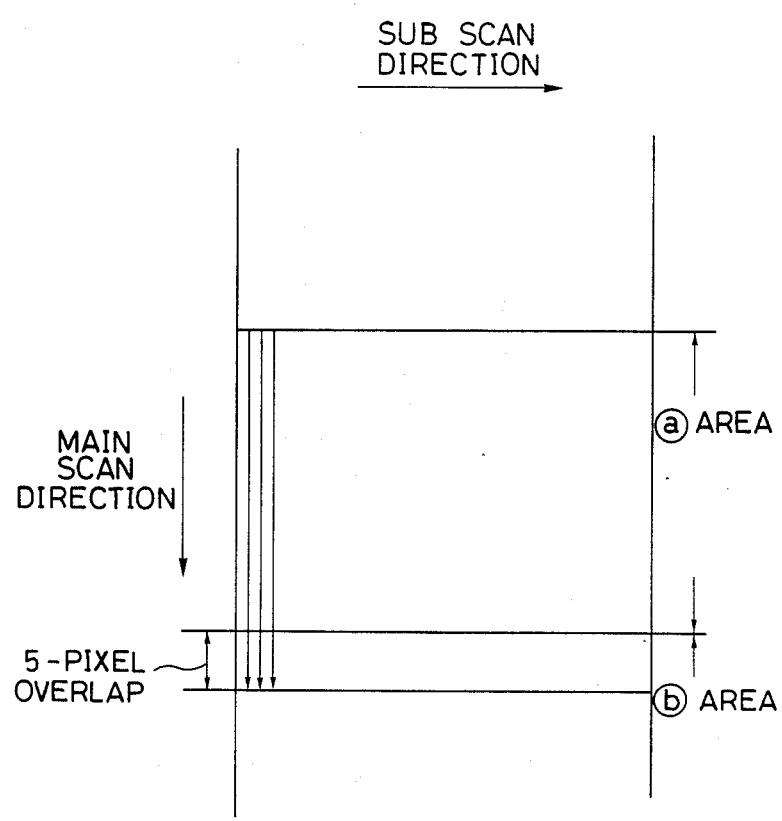
FIGS. 3A, 3B and 3C are schematic views outlining first and second embodiments of the present invention.

FIG. 3A shows the method of bringing the error generated in the area (b) shown in FIG. 2B, into the binary digitization of the pixels in the area (a).

In case of a dispersion matrix which disperses the error in a direction opposite to the direction of proceeding of image processing, as shown in FIG. 2A, one for the reasons of streak black-line formation lies in the fact that the errors generated in the area (b) in FIG. 2B are not reflected in the binary digitizing of the area (a). FIG. 3A shows a method of resolving the error by expanding the area of image reading and binary digitizing to the area (b), thus involving overlapped reading.

More specifically, based on the fact that the errors from the area (b) are principally brought from a portion adjacent to the area (a), the image processing is conducted by overlapped reading including several pixels (for example 5 pixels) beyond the actual output area of binary digitizing.

Figure 3B:
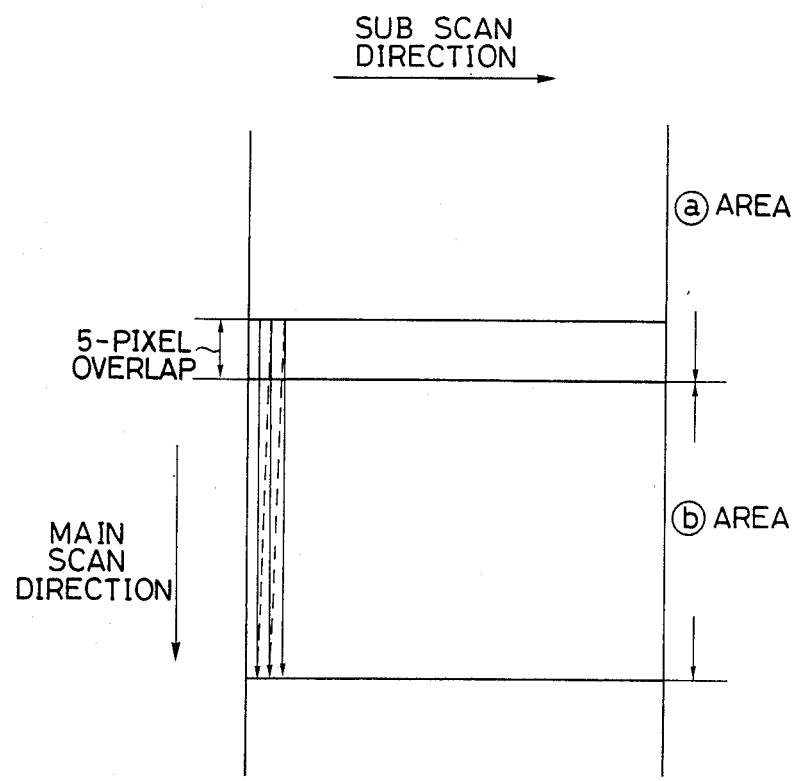

FIG. 3B shows a method of approximation for the carry-over errors from the area (a) to (b) in a similar principle.

Figure 3C:
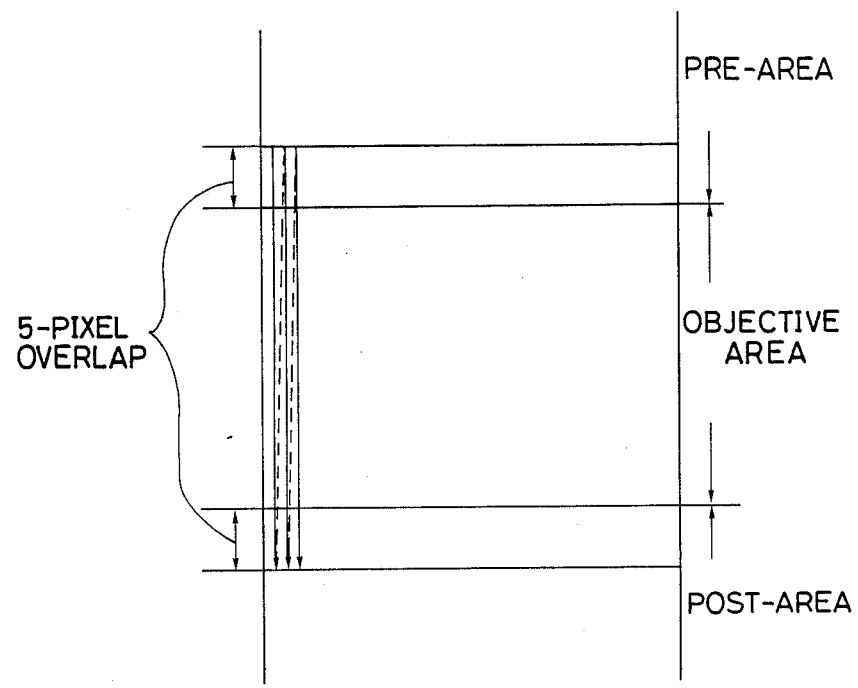

It is therefore possible to suppress the streak at the boundary of the scanning areas, in the processing of an object area as shown in FIG. 3C with a dispersion matrix as shown in FIG. 2A by overlapped reading of several pixels in each line of the object area and of the neighboring two areas.

The present invention will be clarified in greater detail by embodiments thereof.

1ST EMBODIMENT

External view

Figure 4:
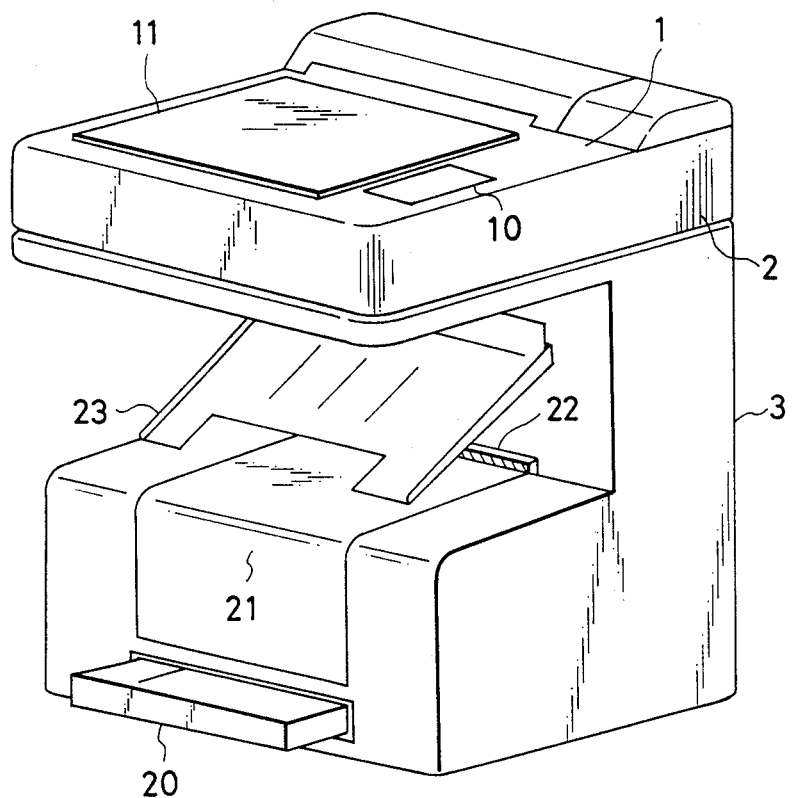
FIG. 4 is a perspective view of a digital color copying machine embodying the present invention.

FIG. 4 is an external view of a digital color copying machine embodying the present invention.

The apparatus can be divided into two portions.

The upper portion shown in FIG. 4 is composed of a color image scanner unit 1 for generating digital color image data by reading an original image, and a controller unit 2 which is incorporated in the scanner unit 1 and is capable processing of the digital color image data and other functions such as interfacing with external equipment.

The scanner unit 1 is provided with a mechanism for reading not only an object or a sheet original placed downwards under an original cover 11 but also a large-sized sheet original.

An operation unit 10 for entering various information for the copying machine is connected to the controller unit 2, which gives instructions to the scanner unit 1 and a printer unit 3 in response to the entered information.

Also, complex editing can be achieved by replacing the original cover 11 with a digitizer connected to the controller unit 2.

In the lower part of FIG. 4 there is shown a printer unit 3 for recording, on a recording sheet, the color digital image signal released from the controller unit 2. In the present embodiment, the printer unit 3 is composed of a full-color ink jet printer utilizing an ink jet recording head disclosed in the Japanese Unexamined Patent Publication (Kokai) No. 54-59936.

The above-explained two portions are separable and can be placed in different positions by extending a connecting cable.

Printer unit

Figure 5:
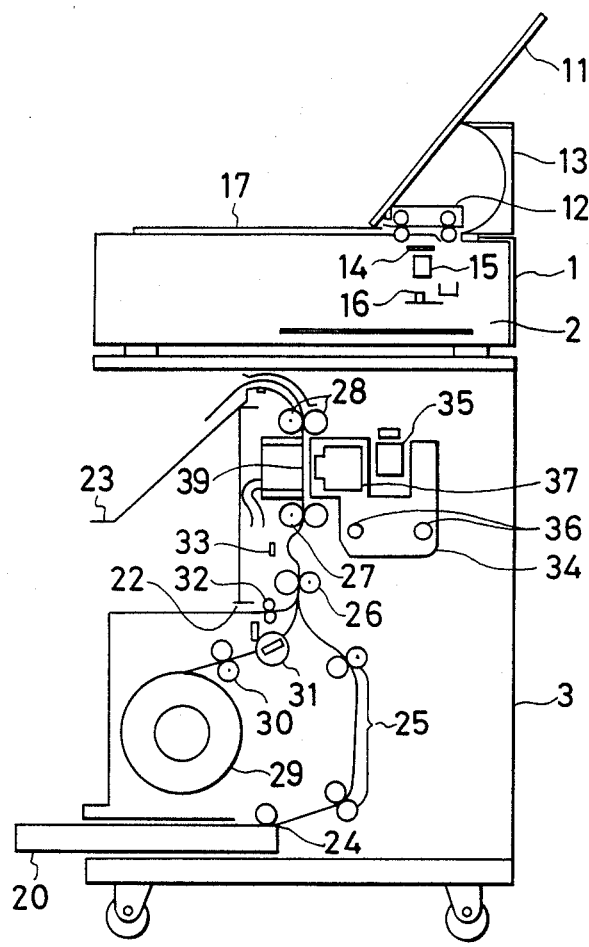
FIG. 5 is a lateral cross-sectional view of the digital color copying machine shown in FIG. 4.

FIG. 5 is a lateral cross-sectional view of the digital color copying apparatus shown in FIG. 4.

The image of an original placed on an original supporting glass 17, or a projected image, or the image of a sheet original fed by a sheet feeding mechanism 12, is read by means of an exposure lamp, a lens 15, and an image device 16, which is a CCD in the present embodiment, capable of reading a line image in full color. The image thus read is subjected to various processing in the scanner unit 1 and the controller unit 2, and is recorded on a recording sheet in the printer unit 3.

In FIG. 5, the recording sheet is supplied either from a sheet cassette 20 storing cut sheets of small fixed sizes (A4 - A3 sizes in the present embodiment) or from a rolled sheet for recordings of large sizes (A2 - A1 sizes in the present embodiment).

Also manual sheet feeding is possible by inserting a sheet, from an inlet 22 shown in FIG. 4, along a cover 21 of the sheet feeding unit.

A pickup roller 24 feeds cut sheets one by one from the cassette 20, and the cut sheet thus fed is transported by transport rollers 25 to a first sheet feeding roller 26.

The rolled sheet 29 is fed by feeding rollers 30, cut into a predetermined length by a cutter 31 and transported to said first sheet feeding roller 26.

Also, the manually inserted sheet is transported from the inlet 22 to the first sheet feeding roller 26 by manual inserting rollers 32.

The pickup roller 24, transport rollers 25, rolled sheet feeding rollers 30, first sheet feeding rollers 26 and manual inserting rollers 32 are driven by an unrepresented sheet feeding motor (composed of a DC servo motor in the present embodiment) and respectively on-off controlled by solenoid clutches attached to these rollers.

When a printing operation is started by an instruction from the controller unit 2, the recording sheet supplied from either of the above-explained paths is transported to the first sheet feeding rollers 26. After a predetermined loop is formed in the sheet for avoiding skewed advancement, said feeding rollers 26 are rotated to transfer the sheet to second sheet feeding rollers 27.

Between the first sheet feeding rollers 26 and the second sheet feeding rollers 27, the recording sheet is given a buffer loop of a predetermined amount for achieving exact sheet advancement between the second sheet feeding roller 27 and transport rollers. A buffer sensor 33 is provided for detecting the amount of said buffer loop. Constant formation of said buffer loop during the sheet transportation reduces the load on the second sheet feeding rollers 27 and the transport rollers 28, particularly in the transportation of large-sizes sheet, and enables exact sheet advancement.

In the printing operation with the recording head 37, a carriage 34 supporting said recording head 37 performs a reciprocating motion on a carriage rail 36 by means of a scanning motor 35. During the forward motion the image is printed on the recording sheet, and, in the reverse motion, the sheet is advanced by a predetermined amount by a sheet feeding motor 28. In this operation, the sheet feeding motor is so controlled as to maintain the predetermiend amount of buffer loop, in cooperation with the buffer sensor 33.

The printed recording sheet is discharged onto a discharge tray 23, and the printing operation is completed.

Figure 6:
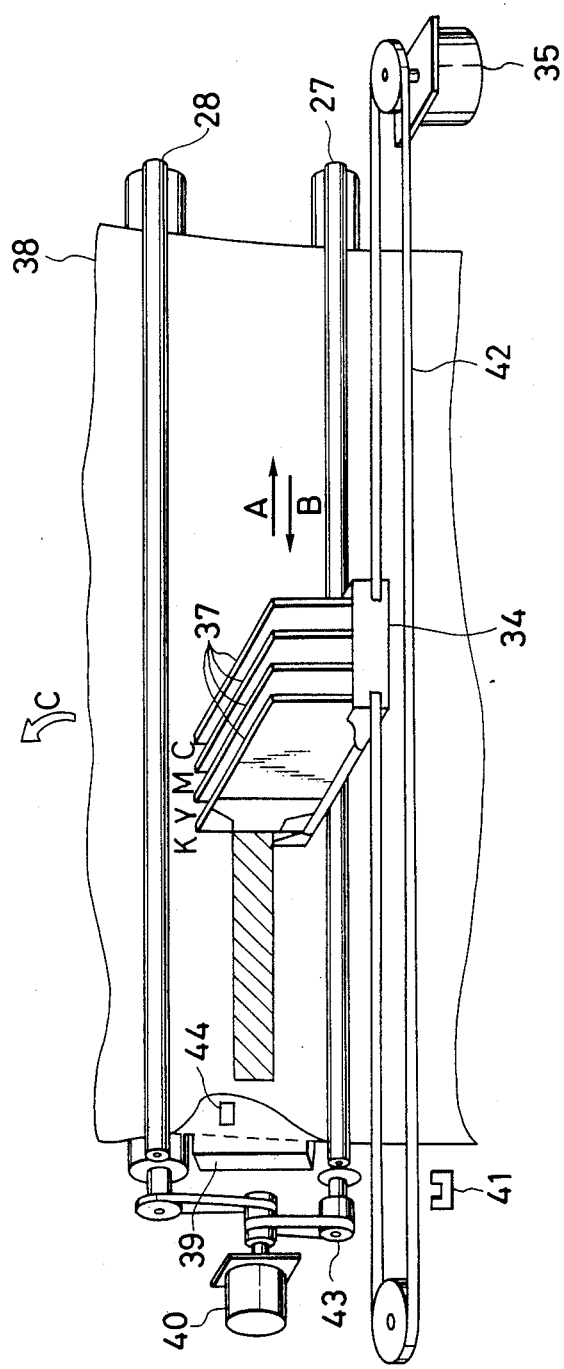
FIG. 6 is a detailed view around a scanning carriage 34.

Now, reference is made to FIG. 6 for explaining the details of the structure around the carriage 34.

A sheet feeding motor 40, for intermittent advancement of the recording sheet, drives the second sheet feeding rollers 27 through a clutch 43, and the transport rollers 28.

A scanning motor 35 moves the carriage 34 in a direction A or B by means of a scanning belt 42. In the present embodiment, for achieving exact control for sheet feeding, stepping motors are employed for the sheet feeding motor 40 and the scanning motor 35.

When the recording sheet reaches the second sheet feeding rollers 27, the clutch 43 therefor and the sheet feeding motor 40 are activated to transport the recording sheet on a platen 39, to the transport rollers 28.

The sheet is detected by a sheet sensor 44 positioned on the platen, and the information from said sensor is utilized for position control and jamming detection.

When the recording sheet reaches the transport rollers 28, the clutch 43 and the sheet feeding motor 40 are turned off, and the sheet is brought into close contact with the platen 39 by suction from the interior of the platen 39 caused by an unrepresented suction motor.

Prior to the image recording operation on the recording sheet, the carriage 34 is moved to the position of a home position sensor 41 Then, in the course of forward motion in the direction A, inks of cyan (C), magenta (M), yellow (Y) and black (K) are emitted from the recording head 37 at predetermined positions to achieve image recording. After the image recording of a predetermined length, the carriage 34 is stopped and is reversed in the direction B to the position of the home position sensor 41. During said reverse motion, the sheet feeding motor 40 drives the transport rollers 28 to advance the recording sheet in a direction C by an amount corresponding to the amount of recording by the recording head 37.

In the present embodiment, the recording head 37 is an ink jet recording head containing 4 assemblies of 256 nozzles each.

When the carriage 34 is returned to the position detected by the home position sensor 41, there is conducted a recovery operation for the recording head 37. This operation is for achieving a stable recording operation, and consists of a pressure application to the recording head 37 and/or a dummy ink emission according to predetermined conditions of sheet feeding time, temerature and emission time, in order to prevent defective ink emission at the start of ink emission caused for example by viscosity change of the ink remaining in the nozzles of the recording head 37.

Image recording on the entire surface of the recording sheet can be achieved by repeating the above-explained procedure.

Scanner unit

Figure 7:
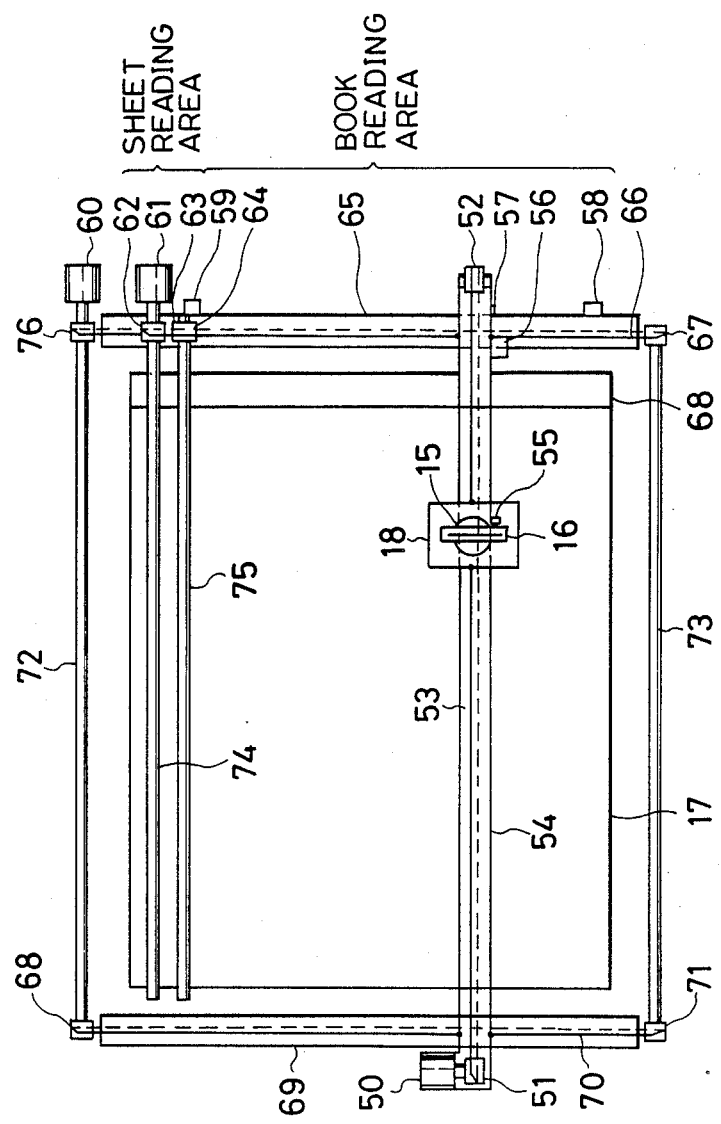
FIG. 7 is a view showing mechanisms in a scanner unit 1.
Figure 8:
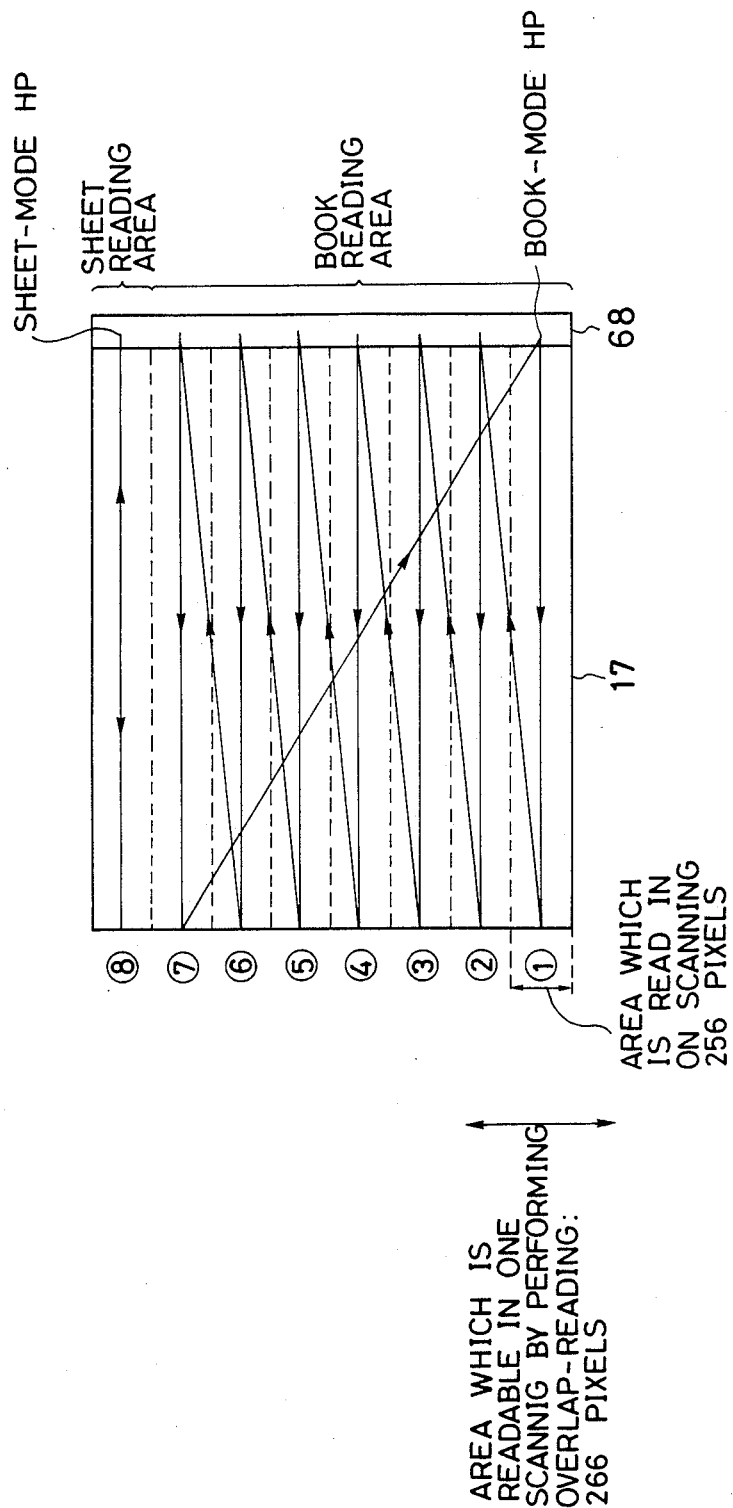
FIG. 8 is a schematic view showing an image reading operation in the book mode and the sheet mode.

Now reference is made to FIGS. 7 and 8 for explaining the function of the scanner unit 1.

FIG. 7 shows the structure in the scanner unit 1.

A CCD unit 18, consisting of a CCD 16, a lens 15 etc. moves along a rail 54 by means of a main scanning driving system consisting of a main scanning motor 50 fixed on the rail 54, pulleys 51, 52 and a wire 53, thereby reading the image on the original supporting glass 17 in the main scanning direction. A light shielding plate 55 and home position sensor (HP sensor) 56 are used for position control in moving the CCD unit 18 to a main scanning home position provided in a correction area 68.

The rail 54 is supported by rails 65, 69 and is moved by a sub scanning driving system consisting of a sub scanning motor 60, pulleys 67, 68, 71, 76, shafts 72, 73 and wires 66, 70. A light shielding plate 57 and home position sensors 58, 59 are used for position control in moving the rail 54 to sub scanning home positions for a book mode for reading a book or an article placed on the glass 17 or a sheet mode for reading a sheet original.

A sheet feeding motor 61, sheet feeding rollers 74, 75, pulleys 62, 64 and a wire 63 constitute a mechanism for feeding sheet originals. Said mechanism is positioned above the original supporting glass 17, and sheet originals placed downwards are advanced by a predetermined amount with the sheet feeding rollers 74, 75.

FIG. 8 illustrates the image reading operation in the book mode and the sheet mode.

In the book mode the CCD unit 18 is moved to the book mode home position (black mode HP) provided in the correction area 68, and the entire surface of the original placed on the glass 17 is read with the CCD unit 18, starting from said home position.

Prior to the scanning of the original, shading correction, black level correction, color correction etc. are conducted in the correction area 68. Thereafter the scanning motion in the main scanning direction is started by the main scanning motor 50. After the image reading of an area (1), the main scanning motor 50 is reversed and the sub scanning motor 60 is activated, thereby moving the CCD unit in the sub scanning direction to the correction area for an area (2). Then, after shading correction, black level correction, color correction etc. if required, the area (2) is read is the same manner as in the area (1).

Areas (1)–(7) are read by repeating the above-explained scanning operation, and, after the image reading of the area (7), the CCD unit 18 is returned to the book mode home position.

In the present embodiment, for reading an original of A2 size at maximum, there is in fact required a larger number of scanning operations, but the scanning operations are simplified in this explanation for ease of understanding.

In the sheet mode, the CCD unit 18 is moved to a sheet mode home position, and the entire surface of the sheet original is read by repeatedly reading the area (8) and intermittently activating the sheet feeding motor 61.

Prior to the scanning motion, shading correction, black level correction, color correction etc. are conducted in the correction area 68, and then the scanning motion is started in the main scanning direction by the main scanning motor. After the completion of the forward reading motion in the area (8), the main scanning motor 50 is reversed, and the sheet feeding motor 61 is simultaneously activated to move the sheet original by a predetermined amount in the sub scanning direction. The above-explained operation is repeated to read the entire surface of the sheet original.

When the above-explained image reading operation is designed for same-size image reproduction, the CCD unit 18 can in fact read a wide area as shown in FIG. 5. This is because the digital color copying apparatus of the present embodiment has functions of image enlargement and image reduction. Since the recording head 37 can record 256 bits only at a time as explained before, an image reduction by 50% for example requires image information of a doubled area of 512 bits at least.

Also the scanner unit 1 is capable of overlapped image reading over plural scanning areas.

In the present embodiment, each scanning area shown in FIG. 8 has 256 pixels in the sub scanning direction.

The overlapped reading means simultaneously reading 5 pixels each of two neighboring areas. Therefore, in the overlapped reading, 266 pixels are read including two neighboring areas.

Explanation of block diagram

In the following there will be explained functional blocks of the digital color copying apparatus of the present embodiment shown in FIG. 9.

Control units 102, 111, 121 respectively control the scanner unit 1, controller unit 2 and printer unit 3, and are each composed of a microcomputer, a program ROM, a data memory, a communication circuit etc. The control units 102–111 and the control units 111–121 are connected by communication lines, and so-called master-slave control is adapted in which the control units 102, 121 are operated by the instructions of the control unit 111.

In the function of a color copying apparatus, the control unit 111 performs control operations in response to the input from the operation unit 10 and the digitizer 114.

The operation unit 10 is composed for example of a liquid crystal display provided thereon with a touch panel composed of transparent electrodes to enable selections such as selections of colors and editing operations. It is also provided with separate keys of higher frequency of use, such as a start key for starting a copying operation, a stop key for interrupting the copying operation, and a reset key for resetting the operation mode to a standard state.

The digitizer 114, for entering positional information indicating the area of trimming, masking, color conversion etc., is connected as an option when a complex editing is required.

The control unit 111 also controls an I/F control unit 112, which is a control circuit for a general parallel interface such as IEEE-488 or so-called GP-IB interface, and said interface is utilized for the input/output of image data with external equipment or remote control by external equipment.

In addition, the control unit 111 controls a multi-level value synthesis unit 106, an image processing unit 107, a binary digitizing unit 108, a binary synthesis unit 109 and a buffer memory 110 for effecting various image processings.

The control unit 102 controls a mechanical drive unit 105 for controlling the mechanism of the above-explained scanner unit 1, an exposure control unit 103 for lamp exposure control in reading a reflective original, and an exposure control unit 104 for exposure control of a halogen lamp 90 when a projector is used. The control unit 102 also controls an analog signal processing unit 100 and an input image processing unit 101 for effecting various image processings.

The control unit 121 controls a mechanical drive unit 105 for controlling the mechanism of the above-explained printer unit 3, and a synchronization delay memory 115 for absorbing the fluctuation in time of the mechanical function of the printer unit 3 and for compensating the delay resulting from mechanical arrangement of the recording heads 117–120.

In the following, the flow of image processing will be explained in more detail, with reference to FIG. 9.

The image focused on the CCD 16 is converted into an analog electrical signal, which is supplied to the analog signal processing unit 100 in serial manner, for example in cycles of red, green and blue.

The analog signal processing unit 100 performs the sampling and holding, dark level correction and dynamic range control for each of red, green and blue colors, and performs an analog-to-digital (A/D) conversion to obtain serial multi-value digital image signals (8 bits for each color in the present embodiment), which are sent to the input image processing unit 101.

Said unit 101 conducts the shading correction, color correction and gamma correction which are required in the image reading system, in the form of a serial multi-value digital image signal.

The multi-value synthesis unit 106 of the controller unit 2 performs selection and synthesis of the serial multi-value digital image signal supplied from the scanner unit 1 and the serial multi-value digital image signal supplied from the parallel interface. The image data, thus selected and synthesized, are sent to the image processing unit 107 in the form of the serial multi-value digital image signal.

The image processing unit 107 conducts edge enhancement, black extraction, undercolor removal (UCR) and masking for color correction for the recording inks to be used in the recording heads 117–120. The obtained output signal, in the form of a serial multi-value digital signal, is supplied to the binary digitizing unit 108 and the buffer memory 110.

The binary digitizing unit 108 binary digitizes the serial multi-value digital image signal by the error dispersion method to obtain binary parallel image signals of four colors. The image data of four colors are sent to the binary synthesis unit 109, while the image data of three colors are sent to the buffer memory 110.

The binary synthesis unit 109 performs selection and synthesis of the binary parallel image signals of three colors supplied from the buffer memory 110 and those of four colors from the binary digitizing unit 108 to obtain binary parallel image signals of four colors.

The buffer memory 110 performs the input and output of multi-value image data or binary image data through the parallel interface.

The synchronization delay memory 115 of the printer unit 3 absorbs the fluctuation in time of the mechanical function of the printer unit 3 and compensates the delay resulting from the mechanical arrangement of the recording heads 117–120, and internally generates timing signals required for driving the recording heads 117–120.

A head driver 116, which is an analog driving circuit for driving the recording heads 117–120, internally generates signals for directly driving said heads.

The recording heads 117–120 respectively emit inks of cyan (C), magenta (M), yellow (Y) and black (K), thus recording an image on a recording sheet.

Timing signals

Figure 9:
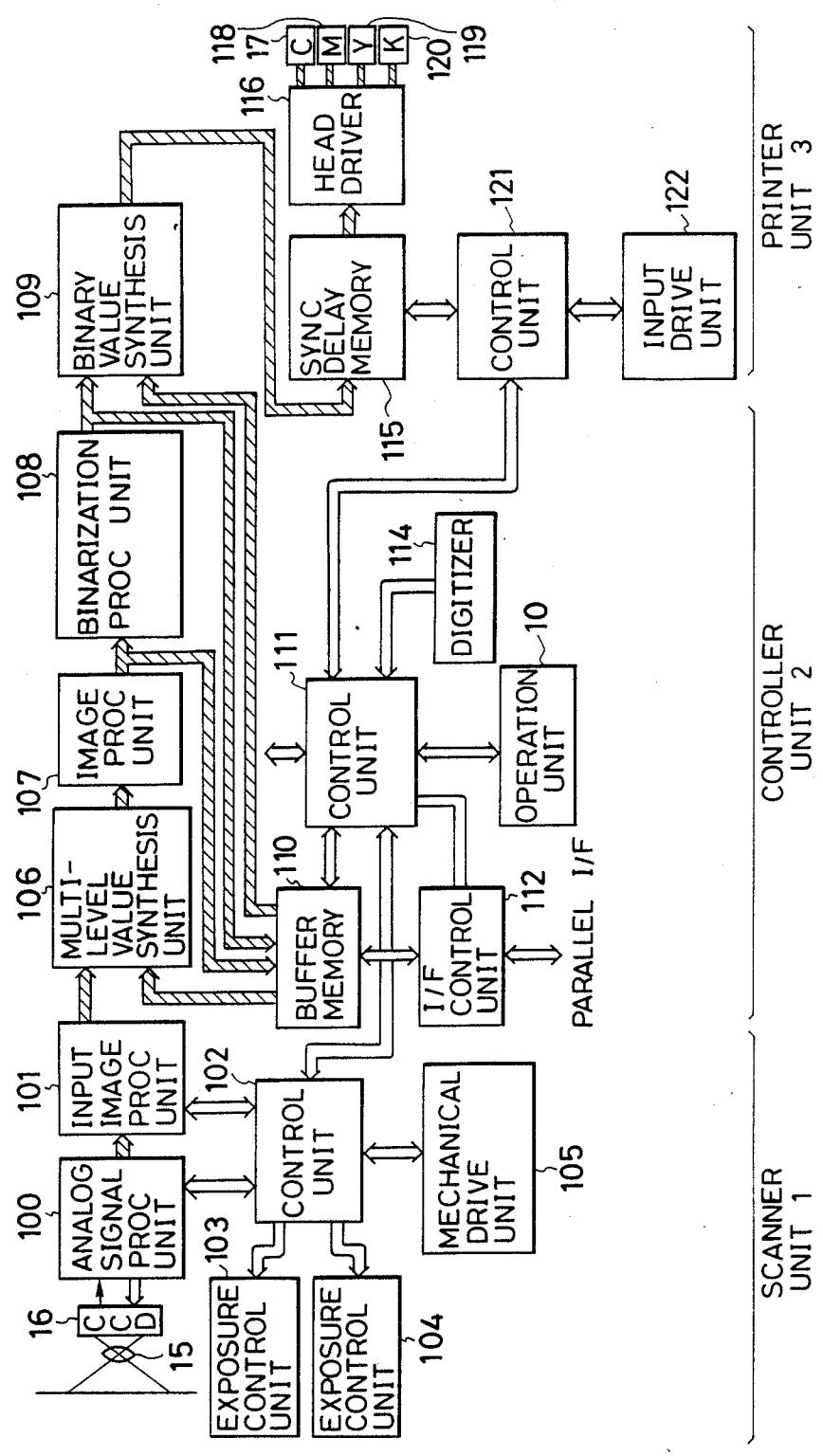
FIG. 9 is a block diagram of the digital color copying machine embodying the present invention.
Figure 10:
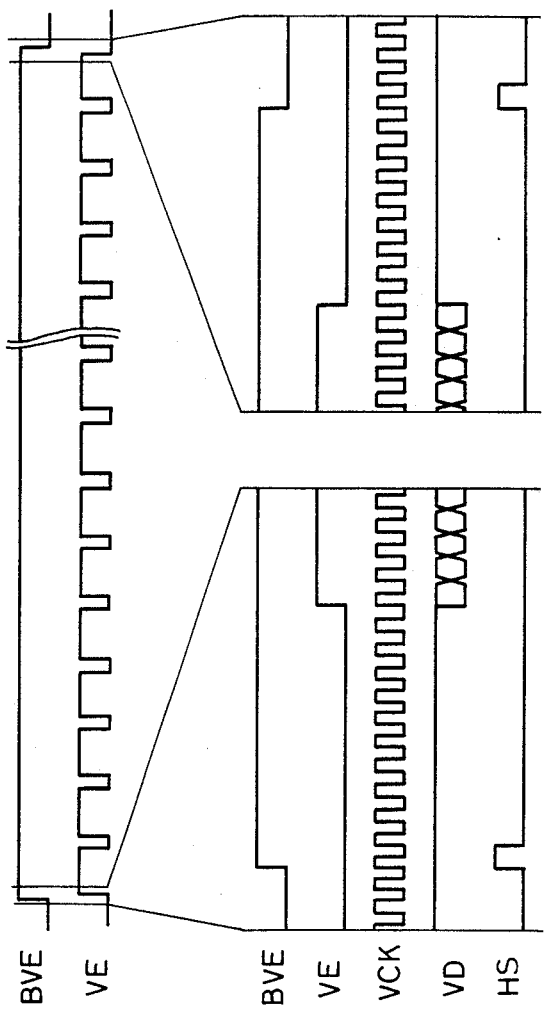
FIG. 10 is a timing chart showing an example of image formation.

FIG. 10 is a timing chart showing signals in the circuit blocks explained in FIG. 9.

A signal BVE indicates the effective image section in each scanning operation of the main scanning explained in relation to FIG. 8. The image output of the entire area is obtained by repeating the signal BVE.

A signal VE indicates the effective image section in each line read by the CCD 16. The signal VE is effective only when the signal BVE is effective.

A signal VCK is a clock signal for the image (video) data VD. The signals BVE and VE change in synchronization with the signal VCK.

A signal HS is used for repeating effective and ineffective sections in discontinuous manner in a line of the signal VE, and is not used if the signal VE is continuously effective during a line. It also indicates the start of image output of a line.

Circuit structure of image processing unit 107

Figure 11:
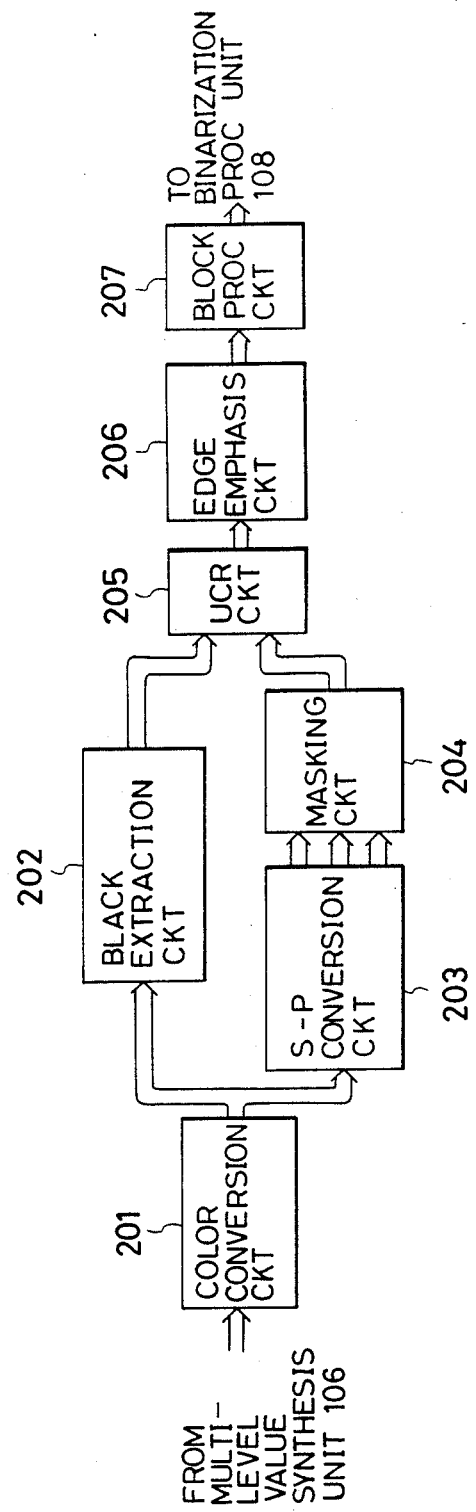
FIG. 11 is a block diagram of an image processing unit 107 in first to fourth embodiments.

Now reference is made to FIG. 11 for explaining the circuit structure of the image processing unit 107.

The color-sequential multi-value image information of three colors (cyan, magenta and yellow) supplied from the multi-value synthesis unit 106 shown in FIG. 9 is supplied to a color conversion circuit 201, for electrically converting a particular color, designated for example by the digitizer 114, into another color. Said circuit enables conversion of a particular color in the original (for example the color of fabric in a designing of clothing) into an arbitrary color.

A serial-parallel (S/P) signal conversion circuit 203 separates the color-sequential multi-value image information of three colors into respective colors for the color processing in a following masking circuit 204.

The masking circuit 204 corrects the input color information, in consideration of the color reproducing performance of the printer, according to the following equation:

$$\begin{bmatrix} Y' \\ M' \\ C' \end{bmatrix} = \begin{bmatrix} a_{11}, a_{12}, a_{13} \\ a_{21}, a_{22}, a_{23} \\ a_{31}, a_{32}, a_{33} \end{bmatrix} \begin{bmatrix} Y \\ M \\ C \end{bmatrix}$$

wherein
Y, M, C: input data
Y', M', C': output data
$a_{11}$–$a_{33}$: correction coefficients A black extraction circuit 202 extracts the black (K) component from the color-sequential multi-value image information of three colors. A color component of lowest density among the components of cyan (C), magenta (M) and yellow (Y) is extracted as the black component.

An undercolor removal (UCR) circuit 205 performs calculation on the black (K) component extracted in the black extraction circuit 202 and the three components of cyan (C), magenta (M) and yellow (Y) for improving the color reproducibility. The color-sequential multi-value color information of three colors (cyan, magenta and yellow) is converted by this circuit into the color-sequential multi-value color information of four colors (cyan, magenta, yellow and black).

Said undercolor removal circuit 205 may also be utilized for gamma correction and image data offsetting, if necessary.

An edge enhancement circuit 206 extracts the edge component for each color and adds or subtracts said edge component to or from the original image data, thereby improving the reproduction of fine lines and giving emphasis to the image. The edge extraction is conducted for example by a 3×3 matrix processing as shown below:

| −1 | −1 | −1 |
|----|----|----|
| −1 | 8  | −1 |
| −1 | −1 | −1 |

A block processing circuit 207 reduces particular stripe patterns generated by the error dispersion method in the image, particularly in the highlight portion thereof.

The image data processed in the block processing circuit 207 are binary digitized in the binary digitizing unit 108 utilizing the error dispersion method.

Said block processing circuit 207 is designed to eliminate stripe patterns which are generated in the vicinity of a steep density change in a highlight image area. This procedure is achieved by dividing the image into 4×4 matrixes for example, and detecting whether the block is in a highlight image portion. If the object block is in the highlight area, the density of the pixels in the block is concentrated to a particularly pixel to form a pseudo screen dot, thereby preventing the cluster formation of dots and thus avoiding the formation of particular stripe patterns.

Figure 12:
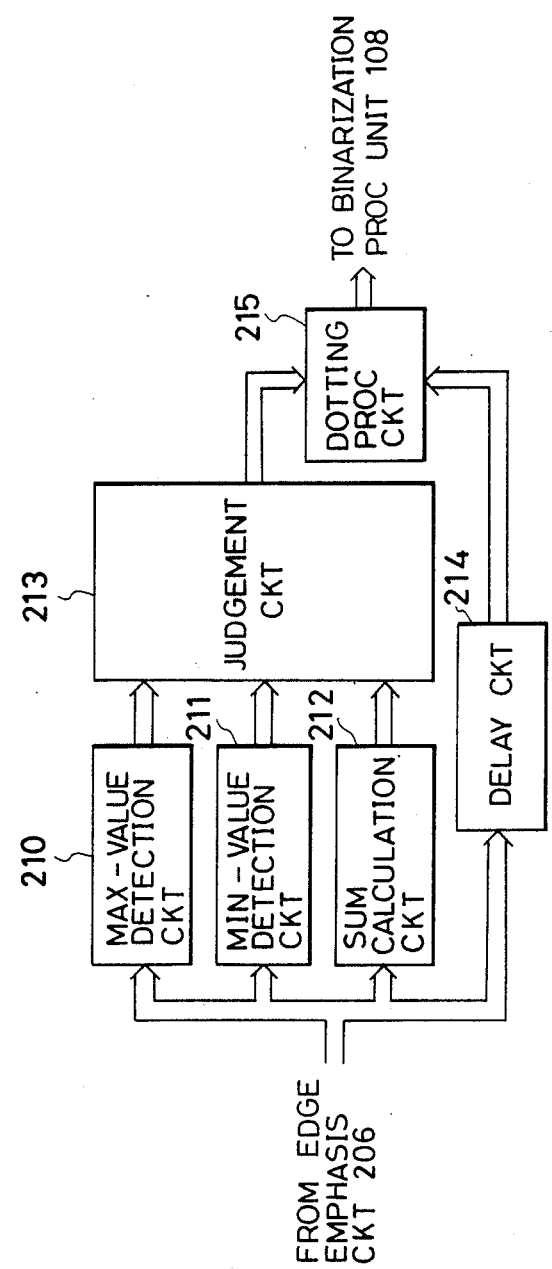
FIG. 12 is a block diagram of a block processing circuit 207.

Now reference is made to FIG. 12 for explaining the circuit structure of said block processing circuit 207.

A maximum detection circuit 210 and a minimum detection circuit 211 respectively detect a maximum density $D_{max}$ and a minimum density $D_{min}$ in the pixlels of the 4×4 matrix divided as a block.

A sum calculation circuit 212 determines the total sum $D_{sum}$ of the density of the pixels in said block.

A judgement circuit 213 performs discriminations, based on the maximum density $D_{max}$, minimum density $D_{min}$ and sum $D_{sum}$, according to the following conditions:

$D_{sum} < D_{const1}(=\text{constant})$ $D_{max} - D_{min} < D_{const2}(=\text{constant})$ When these two conditions are satisfied, a dot forming circuit 215 forms a pseudo screen dot for the pixels in the block. If the conditions are not satisfied, the image data are merely transmitted.

A delay circuit 214 is a line buffer for delaying the pixels during the above-mentioned judgement, and should have a capacity of 4 lines in case of forming a 4×4 matrix as each block.

The dot forming circuit 215 performs the following process on the pixels in the block. The following example shows a case of a 4×4 matrix:

Block A

| # | # | # | # |
|---|---|---|---|
| # | * | # | # |
| # | # | # | # |
| # | # | # | # |

Block B

| # | # | # | # |
|---|---|---|---|
| # | # | # | # |
| # | # | * | # |
| # | # | # | # | wherein:
pixel where density is decreased

* pixel where density is concentrated

The density is decreased to 1/n in each pixel #, and the density is correspondingly increased in the pixel *, so as to conserve the total density in the block. The advantage of the error dispersion method is not lost by this process, since the total density is conserved.

This process may be conducted in a finer manner by increasing the judging conditions mentioned above in combination with the density distribution and the processing blocks.

It is also possible to employ different blocks, such as the blocks A and B shown above, for different colors, in order to prevent overlapping of the dots of different colors.

The probability of dot formation is high at the pixel where the density is concentrated. It is therefore possible to change the position of density concentration by changing the block as indicated by A and B, thereby reducing the probability of concentration of the dots of different colors.

Such block processing allows to the dispersion of printed dots and the prevention of the formation of stripe patterns in the vicinity of a steep density change in the highlight portion.

In the following there will be explained the circuit structure of the binary digitizing circuit 108 using FIGS. 13A and 13B.

It is assumed that the image data are arranged two-dimensionally, and the image data at the i-th pixel in the main scanning direction and j-th pixel in the sub scanning direction are indicated by $D_{ij}$.

Figure 13A:
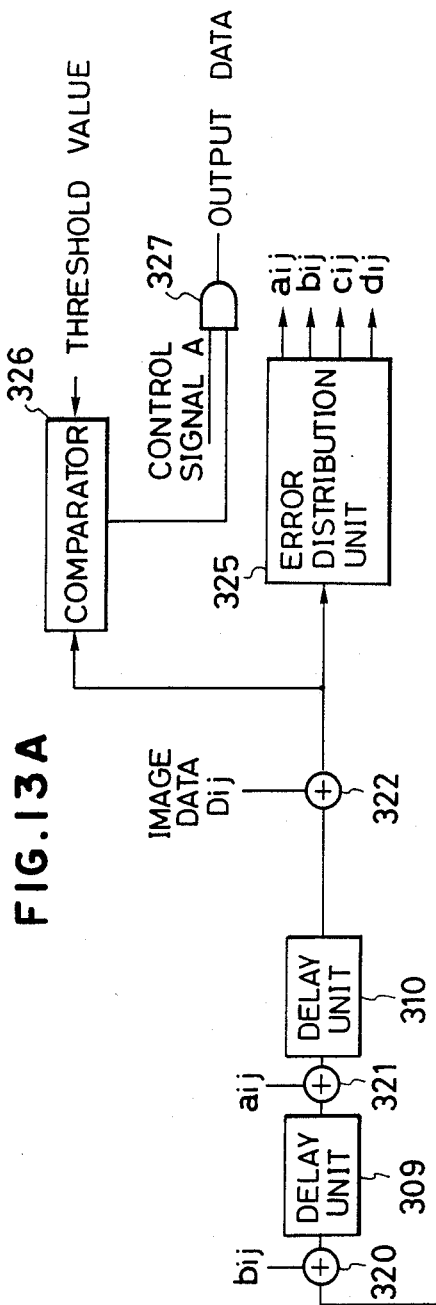
FIG. 13A is a block diagram of a binarizing unit 108 in the first embodiment.
Figure 13B:
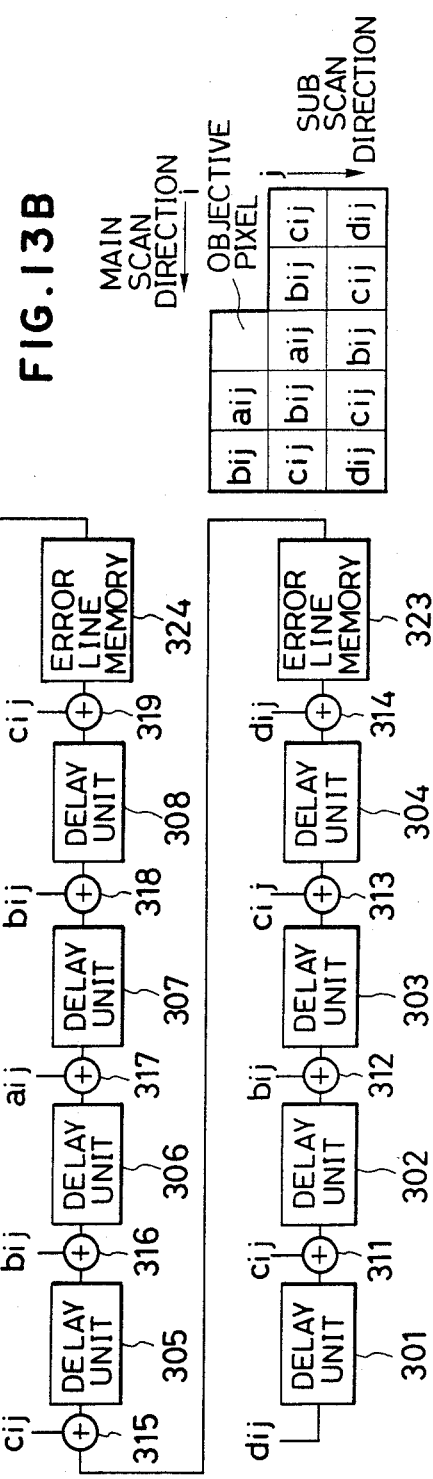
FIG. 13B is a view of an error dispersion matrix in the first and second embodiments.

FIG. 13B shows an error distribution matrix showing the mode of division and distribution, to the surrounding pixels, of the error data generated in the binary digitizing of image data $D_{ij}$ of an object pixel entered in the binary digitizing unit 108. The suffix (ij) indicates that the error is generated from the image data $D_{ij}$.

In the binary digitizing of the present embodiment, the errors are accumulated by the successive shift of the matrix, shown in FIG. 13B in the main scanning direction, and the binary digitizing is conducted on the sum of the errors distributed from plural pixels and the image data entered for the object pixel.

The matrix shown in FIG. 13B is equivalent to that shown in FIG. 2A.

FIG. 13A shows the circuit structure of the binary digitizing unit of the present embodiment.

In FIG. 13A, each of delay units 301–310 is composed of four flip-flops, and delays the color-sequential image data by 4 clock signals or a pixel, for processing of the image data of each color.

There are provided adders 311–322. The adders 311–321 are used for additions or subtraction of error data for calculating the error in the error dispersion matrix, while the adder 322 is used for adding the error data calculated in said matrix with the input image data.

Each of error line memories 323, 324, composed for example of FIFO (first-in-first-out) memories, stores the calculated errors of each line and effects a delay of a line.

There are also provided an error distribution unit 325 composed of a read-only memory (ROM), a comparator 326 for comparing the result of the addition of the error data and the image data with a predetermined threshold value, and an AND gate 327 for controlling the data output by a control signal A.

In the following there will be explained the function of the circuit shown in FIG. 13A.

The image data supplied to the binary digitizing unit 108 are added, in the adder 322, with the error data supplied from the delay unit 310, and are supplied to the error distribution unit 325, which releases error data (a, b, c, d) of a predetermined ratio utilizing a look-up table stored in a ROM. The comparator 326 compares the output of the adder 322 with a predetermined threshold value and releases a binary output "1" or "0". The output signals of the comparator 326 are transmitted only in the necessary pixels by the gate 327.

In response to the image data $D_{ij}$, the error distribution unit 325 releases error data $a_{ij}$, $b_{ij}$, $c_{ij}$ and $d_{ij}$. The error data $d_{ij}$ are delayed corresponding to four colors in the delay unit 301, and, when the processing proceeds in the main scanning direction, are added in the adder 311 with the error data $c_{i+1,j}$ of the same color generated from the image data $D_{i+1,j}$.

The addition of error data is repeated thereafter in the adders 302, 312, 303, 313, 304 and 314 with the progress of the processing, and the output of the adder 314 is supplied to the line memory 323. The added error data thus stored in the line memory 323 are read therefrom after the delay of a line, and supplied to the adder 315.

Thereafter the error data generated in other pixels are added in the adders 305, 316, 306, 317, 307, 318, 308 and 319. After the addition, in the adder 319, of the error data $c_{i+4,j+1}$ generated from the input image data $D_{i+4,j+1}$, the result is supplied to the line memory 324. The error data released from the line memory 324 are subjected to the addition of error data in the adders 320, 321, and are added with the image data in the adder 322. Subsequently the sum of the error data and the image data is supplied to the error distribution unit 325 and the comparator 326. The binarizing process is thereafter continued in the same manner.

The above-explained procedure can be summarized, for example for the input image data $D_{ij}$, in the following manner:

$$DD_{i,j} = D_{i,j} + d_{i-2,j-2} + c_{i-1,j-2} + b_{i,j-2} +$$
$$c_{i+1,j-2} + d_{i+2,j-2} + c_{i-2,j-1} + b_{i-1,j-1} +$$
$$a_{i,j-1} + b_{i+1,j-1} + c_{i+2,j-1} + b_{i-2,j} + a_{i-1,j}$$

wherein:
DD: data after processing
D: image data
i: pixel number in a line (for each color)
j: line number Now reference is made to a timing chart shown in FIG. 14 for explaining the function of the circuit.

Figure 14:
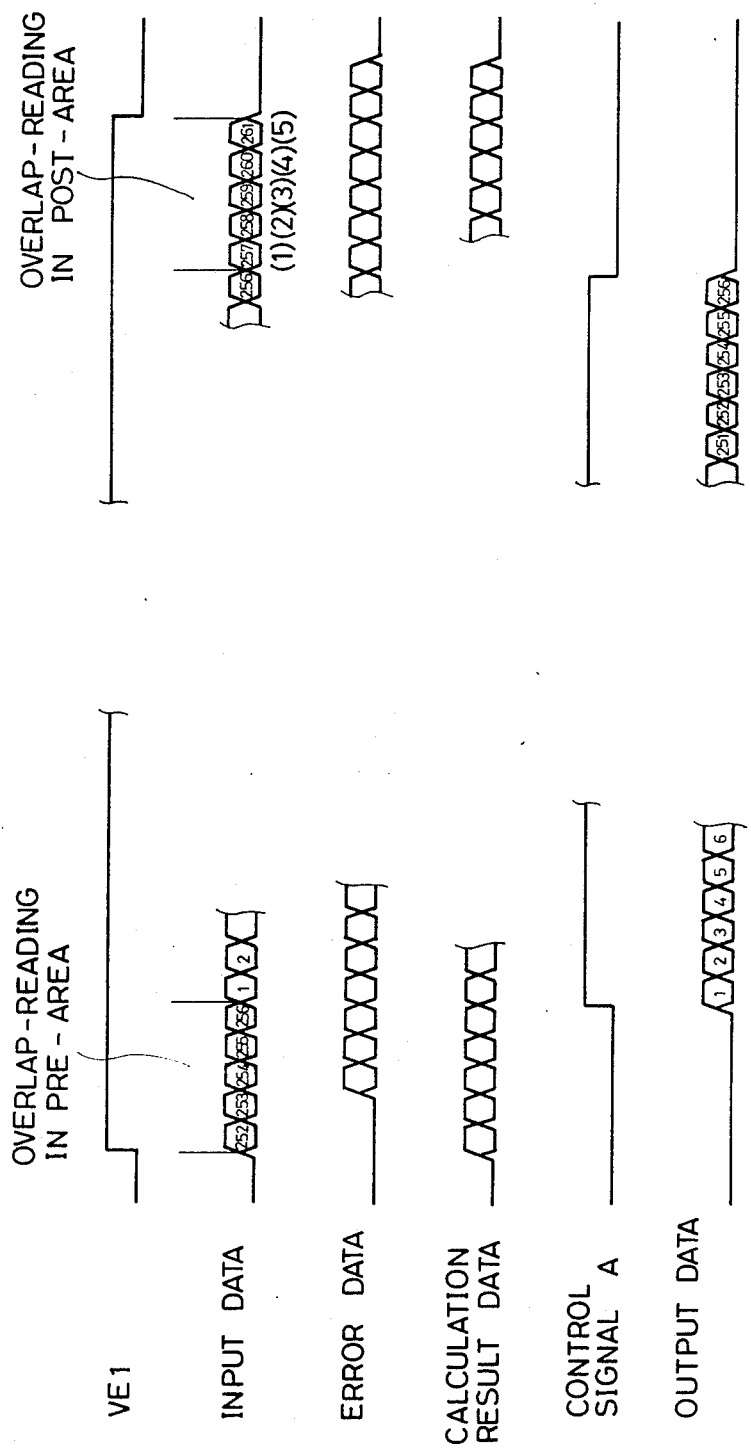
FIG. 14 is a timing chart of the binarizing unit 108 in the first embodiment.

The timing chart shown in FIG. 14 shows a case of a single color for facilitating the understanding of the function. In the actual circuit, the number of pixels is multiplied by the number of colors, namely four times for four colors.

When the overlapped reading is conducted over n pixels in the neighboring areas (5 pixels in each area in case of FIG. 3C), the binary digitizing is conducted in succession from the first pixel entered to the comparator 326. The binarized output data from the comparator 326 are released by the output control unit 327 only by a required number of pixels, starting from the (n+1)-th pixel (first pixel of the object area in case of FIG. 3C). Thus the image data of 2n+256 pixels are entered, as shown in FIG. 14, in synchronization with VE1, because of the overlapped reading of 256 pixels in the object area and n pixels in each of the neighboring areas. These data are binary digitized, and the thus processed data are transmitted by the gate 327 according to the control signal A to obtain the data of 256 pixels of the required object area.

As explained in the foregoing, the discontinuity in the image at the jointing portion can be reduced by an overlapped reading of the image including the areas neighboring the object area and by obtaining the output from the areas in which the errors from said neighboring areas are accumulated.

In the present embodiment, the error distribution unit 325 relies on table conversion by a ROM, but it is naturally possible to use a RAM or a multiplier.

As explained in the foregoing, it is not necessary to add hardware even when there is employed an error dispersion matrix for dispersing errors into the areas neighboring the object area, and the streak at the jointing portion of the image can be reduced to a practically acceptable level, by simple overlapped reading of the neighboring areas and binary digitizing.

Second Embodiment

In the foregoing embodiment, it is possible to reduce the streak at the boundary of the areas in the binary digitizing of the object area, by an overlapped reading of several pixels in each line of two neighboring areas, and binary digitizing of the pixels thus obtained by overlapped reading.

In the second embodiment to be explained in the following, there is employed a line buffer for retaining the carry-over errors from a preceding area, and, in reading the object area, several pixels in each line of a succeeding area are simultaneously read. In processing the 1st and 2nd pixels of each line in the object area, the data of the carry-over errors are read from said line buffer to achieve exact binary digitizing of the object area.

In the second embodiment, the structures shown in FIGS. 4 to 12 are the same as those of the first embodiment and will not, therefore, be explained.

Referring to FIG. 8, the second embodiment effects binary digitizing by an overlapped reading only covering the succeeding area neighboring the object area.

Figure 15:
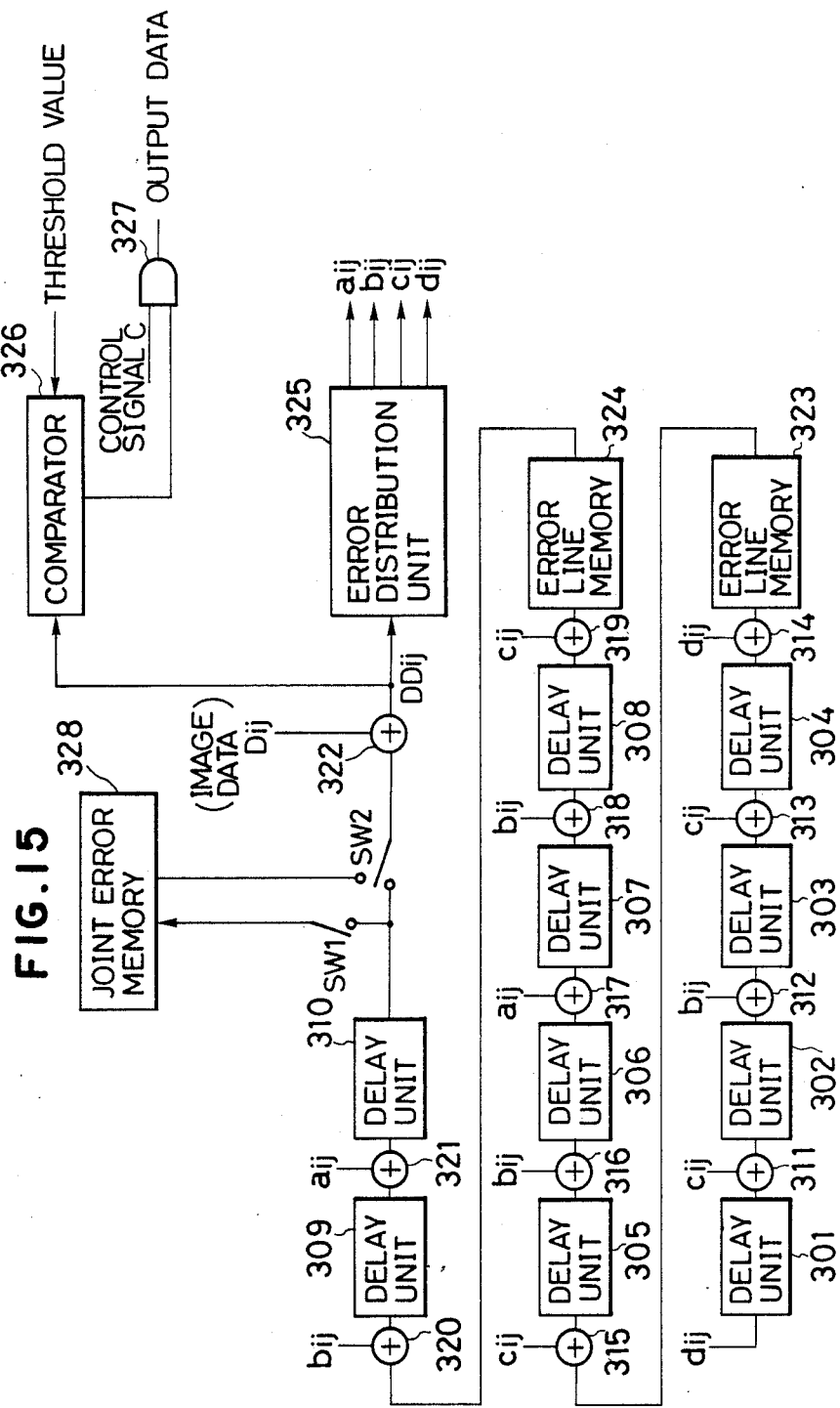
FIG. 15 is a block diagram of the binarizing unit 108 in the second embodiment.

FIG. 15 is a circuit diagram of the binary digitizing unit 108 shown in FIG. 9, partially modified from the circuit of the first embodiment shown in FIG. 13A.

The circuit shown in FIG. 15 is different in the presence of a joint error memory 328, from that shown in FIG. 13A.

In FIG. 15, the same components as those in FIG. 13A are represented by the same numbers and will not be explained further.

The joint error memory 328 is used for storing the error data in the joint portion between the object area and the succeeding area shown in FIG. 3C.

A control signal C is used for controlling the data output from the AND gate 327.

In the following there will be explained the function of the image jointing unit, with reference to FIGS. 15 and 16.

FIG. 16 is a timing chart showing the function for a single color for facilitating understanding.

A scanning operation of the CCD unit 18 in the scanner unit 1 explained before provides image data of plural lines.

In the first scanning operation a switch SW1 is closed with the timing of a control signal B shown in FIG. 16 whereby the error data to be added to the image data of the 257th and 258th pixels in each line of the area (a) shown in FIG. 3A (corresponding to the 1st and 2nd pixels in the area (b)) are supplied from the delay unit 310 and stored in the joint error memory 328. These error data are read from the joint error memory 328, in synchronization with the image data of the 1st and 2nd pixels of corresponding lines obtained in the succeeding scanning operation. For this purpose a switch SW2 is closed with the timing of a control signal A shown in FIG. 16. The error data thus read are sent through the switch SW2 to the adder 322, then added to the corresponding image data, and supplied to the error distribution unit 325 and the comparator 326 for error distribution and binary digitizing. Then, the error data to be added to the image data of the 257th and 258th pixels of the area (b) (corresponding to the 1st and 2nd pixels of an area succeeding the area (b)) are stored in the joint error memory 328 through the switch SW1 as in the first scanning operation. Thereafter the writing and reading of the error data of the jointing portion to and from the joint error memory 328 are conducted according to the timing shown in FIG. 16.

As explained in the foregoing, a smooth output image without streaking in the jointing portion can be obtained by considering the errors affecting the jointing portion through an overlapped reading of the succeeding area, and by conserving the error information of the jointing portion.

In this manner it is possible to eliminate the streaking at the jointing portion of the image areas by an overlapped reading of the object area and the succeeding area and by the use of a memory for storing the errors carried over from the preceding image area.

Third embodiment

The foregoing first and second embodiments are to eliminate the streak formation at the jointing portion of the image through the use of a dispersion matrix shown in FIG. 2A.

In the processing with the dispersion matrix shown in FIG. 2A, the binary digitizing of the 255th and 256th pixels in each line of the area (a) cannot be exactly achieved without the error information generated in the 1st and 2nd pixels in each line of the area (b) shown in FIG. 2B. Consequently, for achieving correct binary digitizing of the 255th and 256th pixels in each line of the area (a), the form of the dispersion matrix may be so modified that the errors generated in the area (b) are not added to the area (a).

Figures 17A, 17B:
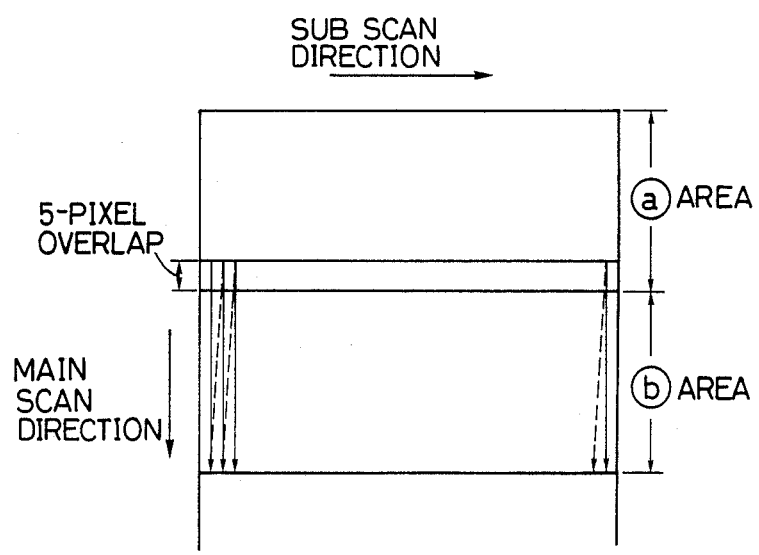
FIGS. 17A, 17B and 17C are schematic views showing the third embodiment.

A dispersion matrix shown in FIG. 17A is so constructed that the errors are not distributed to the pixels in a direction opposite to tha main scanning direction. Said dispersion matrix is formed as a 4×4 matrix, but it may assume any form as long as the errors are not distributed in the pixels positioned in a direction opposite to the main scanning direction.

When the dispersion matrix shown in FIG. 17A, which does not distribute the errors to the pixels in a direction opposite to the main scanning direction, is employed, the binary digitizing of the 255th and 256th pixels in each line of the area (a) shown in FIG. 2B can be achieved correctly since no errors are to be added to the 255th and 256th pixels in each line of the area (a) from the 1st and 2nd pixels in each line of the area (b). However the binary digitizing of the 1st and 2nd pixels in each line of the area (b) cannot be achieved correctly since there are no carryover errors from the area (a) as explained before.

In order to resolve this drawback, it is possible to effect an overlapped reading, covering several pixels (for example 5 pixels) adjacent to the area (b) in each line of the area (a) in reading the area (b) as shown in FIG. 17B and to obtain the result of processing only from the image area (b).

This method does not exactly reproduce the carry-over errors from the area (a), but the approximate data produced in this method is practically acceptable since only the pixels of the area (a) close to the area (b) affect the area (b).

Figure 17C:
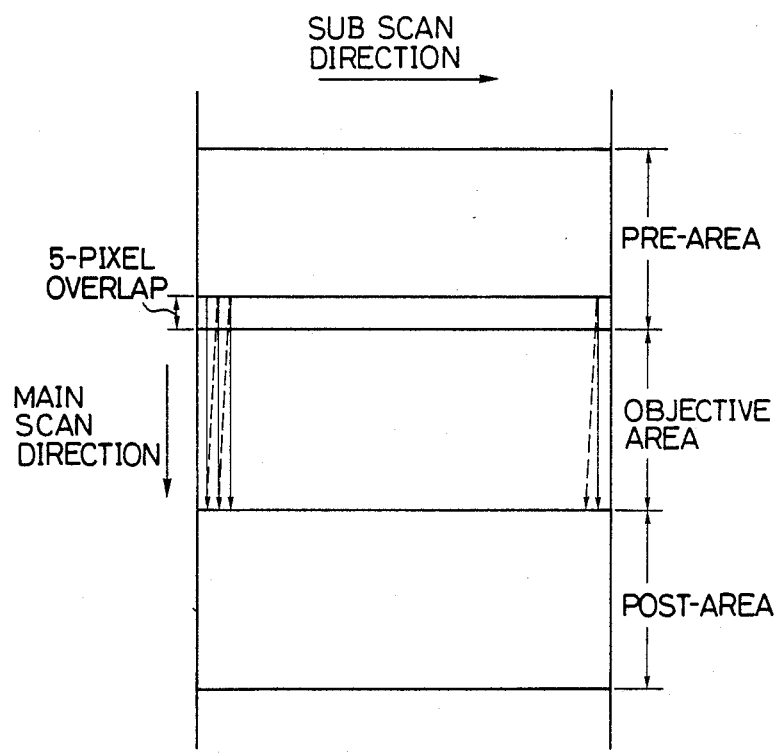

It is therefore possible to eliminate the streak formed at the boundary between the image areas by using a dispersion matrix as shown in FIG. 17A and reading several pixels (for example 5 pixels) in each line of the preceding area simultaneously with the reading of the object area as shown in FIG. 17C.

The structures of the first embodiment shown in FIGS. 4 to 12 are also employed in the third embodiment, and will not, therefore, be explained again.

Referring to FIG. 8, the image reading in the third embodiment is conducted in overlapping manner, covering only the preceding area adjacent to the object area for binary digitizing.

FIGS. 18A and 18B show the circuit structure of the binary digitizing unit 108 employed in the third embodiment.

The image data are arranged two-dimensionally, and $D_{ij}$ indicates the image data of a pixel at an i-th position in the main scanning direction and a j-th position in the sub scanning direction.

FIG. 18B shows an error distribution matrix which defines the distribution, to 15 surrounding pixels, with predetermined proportions, of the error generated in the binary digitizing of the image data $D_{ij}$ of an arbitrary pixel entered to the binary digitizing unit 108. The suffixes i, j attached to the error data indicate that said error is generated from the image data $D_{ij}$.

In this manner, in the present binary digitizing, the errors are accumulated by the successive shifting of the matrix, shown in FIG. 18B in the main scanning direction by a pixel at a time, and the binary digitizing process is conducted on the sum of the image data of the object pixel and the sum of errors distributed from plural pixels.

FIG. 18A is a circuit diagram showing the binary digitizing unit employed in the present embodiment.

In FIG. 18A, each of delay units 401-412 is composed of four flip-flops, and delays the color-sequential image data by 4 clock signals or a pixel, for processing of the image data of each color.

There are provided adders 413-427. The adders 413-426 are used for additions or subtractions of error data for calculating the errors in the error dispersion matrix, while the adder 427 is used for adding the error data calculated in said matrix with the input image data.

Each of error line memories 428, 430, composed for example of FIFO (first-in-first-out) memories, stores the calculated errors of each line and effects a delay of a line.

There are also provided an error distribution unit 431 composed of a read-only memory (ROM), a comparator 432 for comparing the result of addition of the error data and the image data with a predetermined threshold value, and a gate 433 for controlling the output of the data.

In the following there will be explained the function of the circuit shown in FIG. 18A.

The image data supplied to the binary digitizing unit 108 are added, in the adder 427, with the error data supplied from the delay unit 412, and are supplied to the error distribution unit 431, which releases error data (a, b, c, d, e, f, g) of a predetermined ratio utilizing a look-up table stored in a ROM. The comparator 432 compares the output of the adder 427 with a predetermined threshold value and releases a binary output "1" or "0". The output signals of the comparator 432 are transmitted only in the necessary pixels by the gate 433.

In response to the image data $D_{ij}$, the error distribution unit 431 releases error data $a_{ij}$, $b_{ij}$, $c_{ij}$, $d_{ij}$, $e_{ij}$, $f_{ij}$ and $g_{ij}$. The data $g_{ij}$ are delayed corresponding to four colors in the delay unit 401, and, when the processing proceeds in the main scanning direction, are added in the adder 413 with the error data $g_{i+1,j}$ of the same color generated from the image data $D_{i+1,j}$.

Thereafter the addition of error data is repeated in the adders 402, 414, 403 and 415 with the progress of the processing, and the output of the adder 415 is supplied to the line memory 428. The added error data thus stored in the line memory 428 are read therefrom after the delay of a line, and supplied to the adder 416.

Thereafter the error data generated in other pixels are added in the adders 404, 417, 405, 418, 406 and 419. After the addition, in the adder 419, of the error data $c_{i+3,j+1}$ generated from the input image data $D_{i+3,j+1}$, the result is supplied to the line memory 427. The error data released from the line memory 427 are supplied to the adder 420, then processed in the similar manner in the adders 407, 421, 408, 422, 409 and 423, and, after the addition of the error data in the adder 423, supplied to the line memory 430.

The error data released from the line memory 430 are subjected to the additions of error data in the adders 424, 410, 425, 411, and 426, and further added with the image data in the adder 247. The result of addition of the error data and the image data are supplied to the error distribution unit 331 and the comparator 332.

Figure 19:
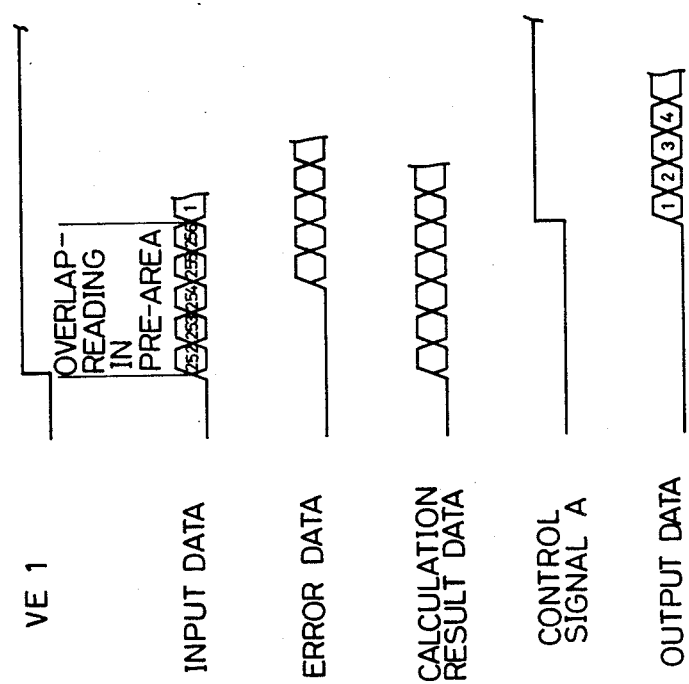
FIG. 19 is a timing chart of the binarizing unit 108 in the third embodiment.

The above-explained procedure can be summarized, for example for the input image data $D_{ij}$, in the following manner:

$$DD_{i,j} = D_{i,j} + g_{i-3,j-3} + g_{i-2,j-3} + f_{i-1,j-3} + e_{i,j-3} +$$
$$g_{i-3,j-2} + e_{i-2,j-2} + d_{i-1,j-2} + c_{i,j-2} + f_{i-3,j-1} +$$
$$d_{i-2,j-1} + b_{i-1,j-1} + a_{i,j-1} + e_{i-3,j} + c_{i-2,j} + a_{i-1,j}$$

wherein:
DD: data after processing
D: image data
i: pixel number in a line (for each color)
j: line number Now reference is made to a timing chart shown in FIG. 19 for explaining the function of the circuit. Said timing chart shows a case of a single color for facilitating the understanding of the function. In the actual circuit, the number of pixels is multiplied by the number of colors, namely four times for four colors.

When the overlapped reading is conducted over n pixels in the neighboring area (5 pixel in FIG. 17C for example), the binary digitizing is conducted in succession from the first pixel entered to the comparator 432. The binarized output data from the comparator 432 are released by the output control unit 433 only by a required number of pixels, starting from the (n+1)-th pixel (corresponding to the 1st pixel in the object area in FIG. 17C). Thus, the image data of n+256 pixels are entered, as shown in FIG. 14, in synchronization with the signal VE1, because of the overlapped reading of 256 pixels in the object area and n pixels in the preceding area. These data are binary digitized, and the thus processed data are transmitted according to the control signal A to obtain the data of 256 pixels.

As explained in the foregoing, the streak formation at the jointing portion of the image areas can be prevented by employing a matrix which does not distribute the errors in an area preceding the object area, and effecting binary digitizing by an overlapped reading covering the preceding area.

In the present embodiment, the error distribution unit 431 relies on a table conversion utilizing a ROM, but there may naturally be employed a RAM or a multiplier.

Fourth embodiment

The foregoing third embodiment employs a matrix (FIG. 17A) which does not distribute the errors in the pixels in a direction opposite to the main scanning direction with respect to the object pixel, thereby avoiding the distribution of the errors, generated in the 1st and 2nd pixels in each line of the succeeding area, to the object area and thus achieving correct binary digitizing of the 255th and 256th pixels in each line of the object area. Also in the binary digitizing of the 1st and 2nd pixels in each line of the succeeding area, there should only be considered the errors carried over from the object area to the succeeding area, so that the binary digitizing is conducted by an overlapped reading, covering the object area.

In the fourth embodiment explained in the following, there is employed a line buffer for conserving the carry-over errors from the 255th and 256th pixels in each line of the preceding area, shown in FIG. 20, for addition to the 1st and 2nd pixels in each line of the object area. Thus, in the processing of the object area, the carry-over error data are read from said line buffer and added to the 1st and 2nd pixels in each line of the object area.

Thus, it is possible to completely eliminate the streak generated at the boundary of the image areas by employing a dispersion matrix as shown in FIG. 17A and also employing a line buffer for conserving the carry-over errors from the pixels of the preceding area, for addition to the pixels in the object area.

In the fourth embodiment, the structures shown in FIGS. 4 to 12 are the same as those employed in the first embodiment and will not, therefore, be explained.

Figure 21:
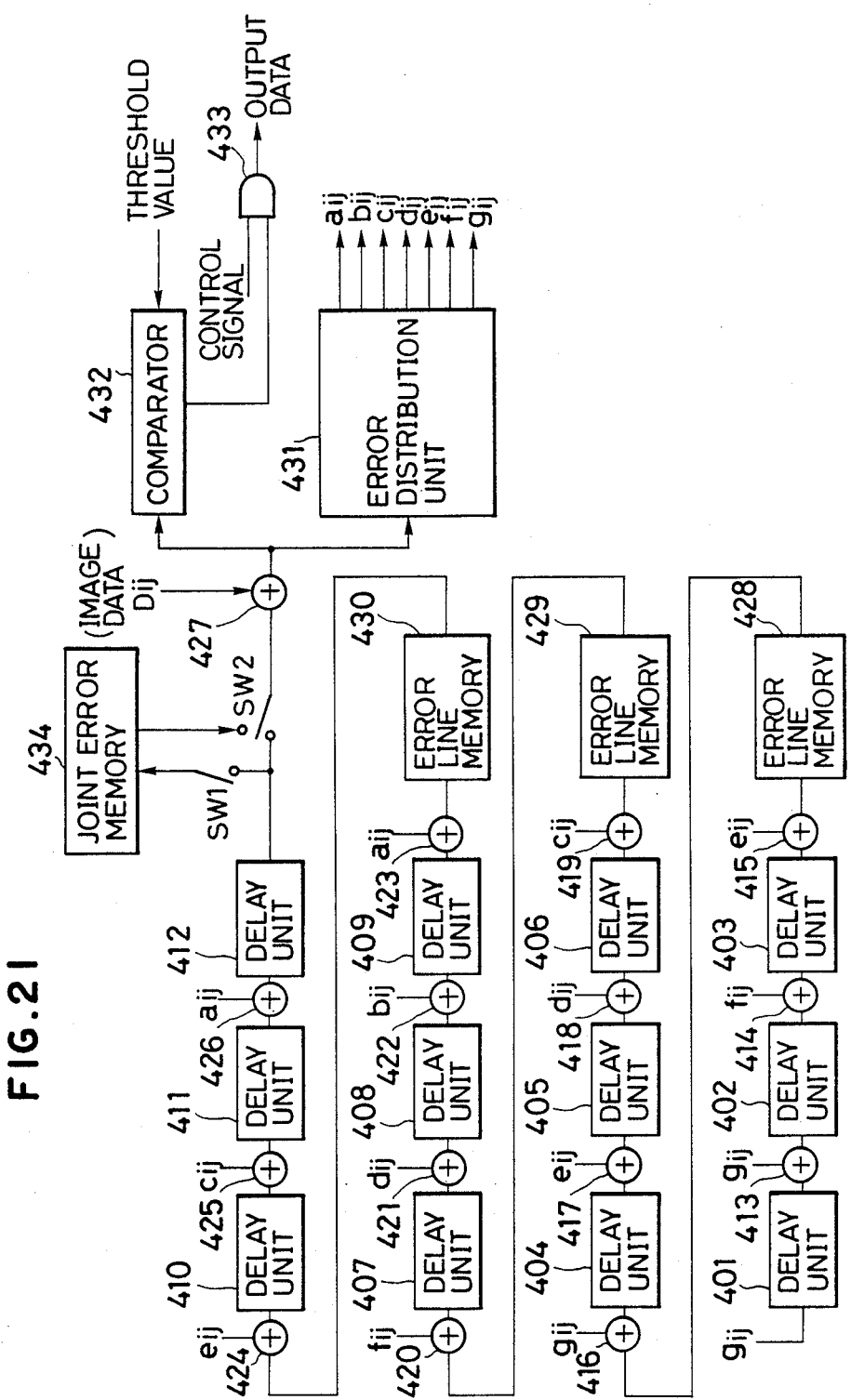
FIG. 21 is a block diagram of the binarizing unit 108 in the fourth embodiment.

FIG. 21 is a circuit diagram of the binary digitizing unit 108 shown in FIG. 9, partially modified from that of the third embodiment shown in FIG. 18A. The circuit shown in FIG. 21 is different in the presence of a joint error memory 434, from that shown in FIG. 18A.

In FIG. 21, the same components as those in FIG. 18A are represented by the same numbers and will not be explained further.

The joint error memory 434 is used for storing error data to be carried over from the preceding area to the object area.

In the following there will be explained the function of the circuit, with reference to a timing chart shown in FIG. 22 which shows a case of a single color for each of understanding. In the actual circuit, the number of pixels is multiplied by the number of colors, namely four times for four colors.

A scanning operation of the CCD unit 18 in the scanner unit 1 explained before provides image data of plural lines.

Figure 20:
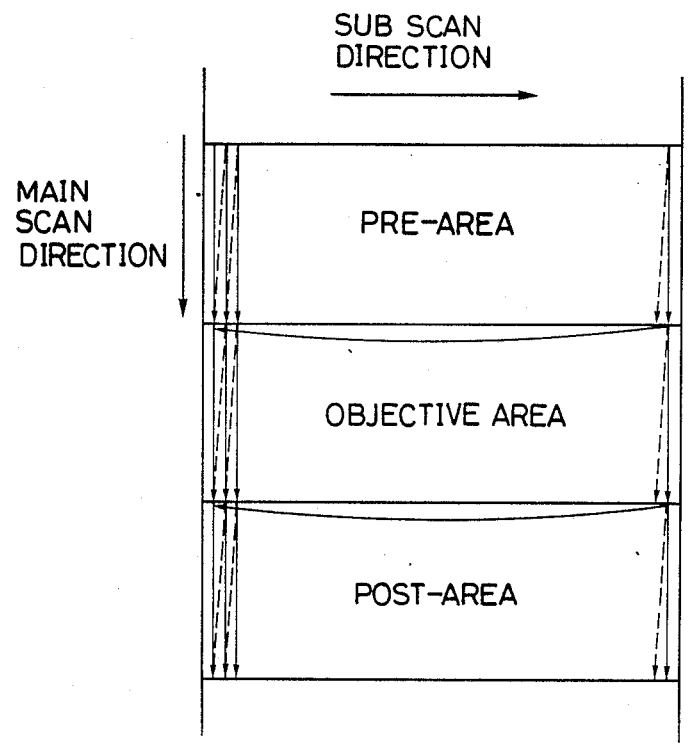
FIG. 20 is a schematic view showing the fourth embodiment.
Figure 22:
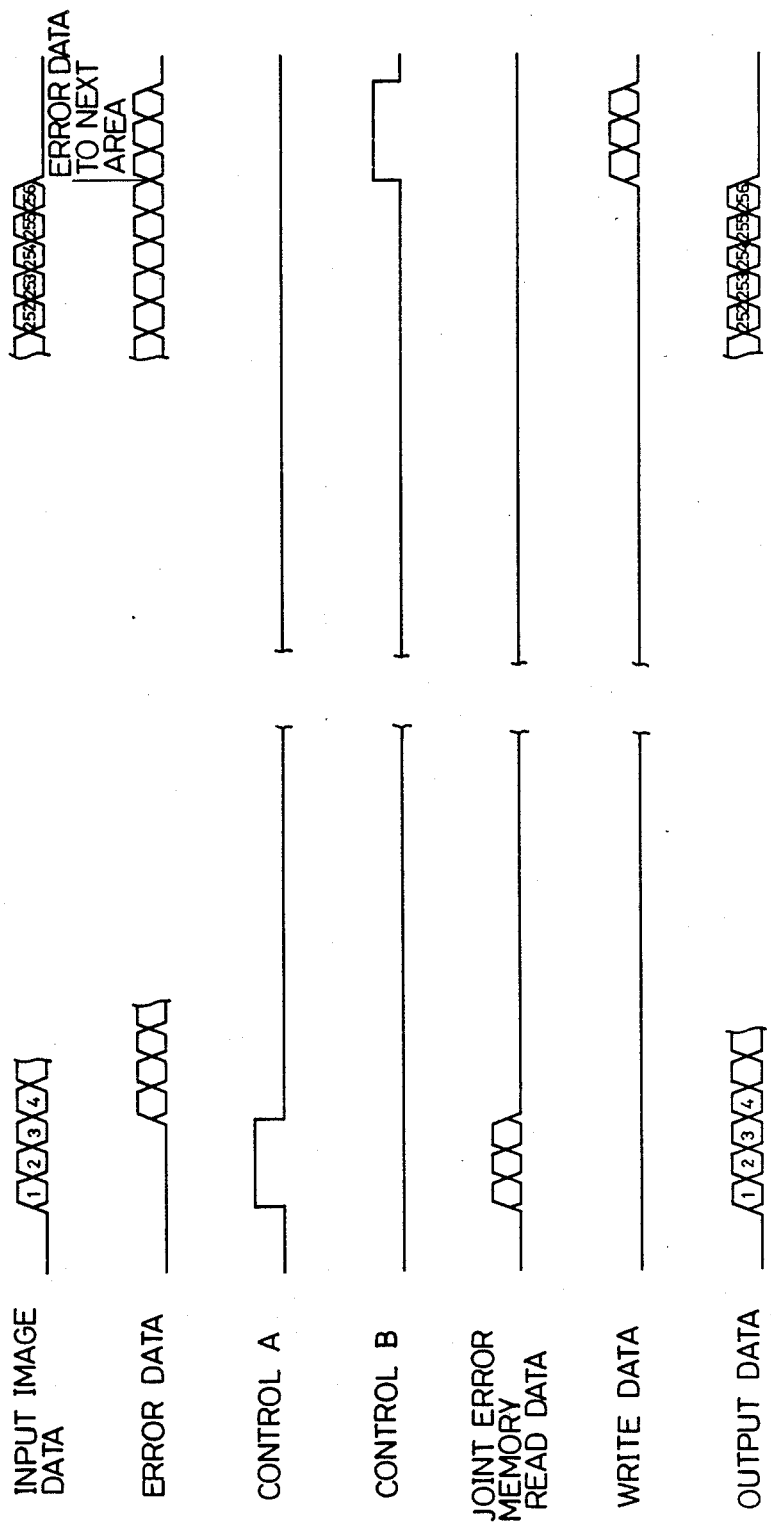
FIG. 22 is a timing chart of the binarizing unit in the fourth embodiment.

In the first scanning operation for processing the object area shown in FIG. 20, a switch SW1 is closed with the timing of a control signal B shown in FIG. 22, whereby the error data to be added to the image data of the 257th, 258th and 259th pixels in each line of the post-area shown in FIG. 20 (corresponding to the 1st, 2nd and 3rd pixels in the post-area) are supplied from the delay unit 412 and stored in the joint error memory 434. These error data are read from the joint error memory 434, in synchronization with the image data of the 1st, 2nd and 3rd pixels of corresponding lines obtained in the succeeding scanning operation. For this purpose a switch SW2 is closed with the timing of a control signal A shown in FIG. 22. The error data thus read are sent through the switch SW2 to the adder 427, then added to the corresponding image data, and supplied to the error distribution unit 431 and the comparator 432 for error distribution and binary digitizing. Then, the error data to be added to the image data of the 257th, 258th and 259th pixels of the post-area (corresponding to the 1st, 2nd and 3rd pixels of an area succeeding the post-area) are stored in the joint error memory 434 through the switch SW1 as in the first scanning operation explained above.

Thereafter, the writing and reading of the error data of the jointing portion to and from the joint error memory 434 are conducted according to the timing shown in FIG. 22.

As explained in the foregoing, a smooth output image without streaking in the jointing portion can be obtained by employing a matrix which does not distribute the errors to the pixels in a direction opposite to the main scanning direction, and by conserving the error information in said jointing portion.

In this manner it is possible to completely prevent the streak formation at the jointing portion of the image areas by storing, in a memory, the error data generated in the image processing in such jointing portion and conducting subsequent image processing based on the thus stored error data.

Also as shown in the present embodiment, the use of an error dispersion matrix which does not disperse the errors from the object area to a preceding area avoids the necessity of error feedback from said object area to the preceeding area already processed. Thus, the jointing of image areas becomes very easy, and the streak formation at the boundary of image areas can be prevented.

Fifth embodiment

The dispersion matrix as shown in FIG. 2A has been associated with the drawbacks explained above in the related background. The fifth embodiment of the present invention prevents the formation of streaking, at the boundary at areas (a) and (b) shown in FIG. 23, by storing the data of a scanning operation (for example data of the area (a)) in a memory converting the signal processing direction in the main and sub scanning directions.

Figure 1A:
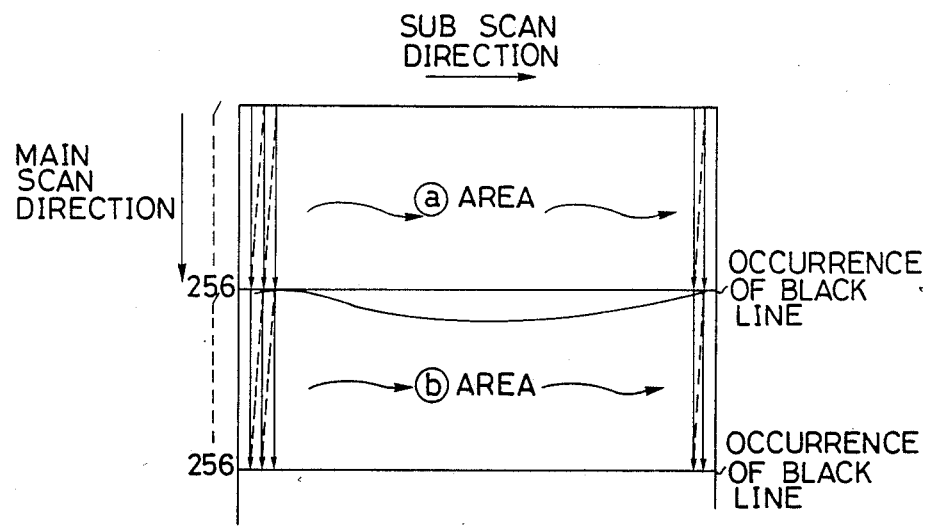
FIGS. 1A and 1B are schematic views of an example of image processing showing the drawback to be resolved by the present invention.
Figure 1B:
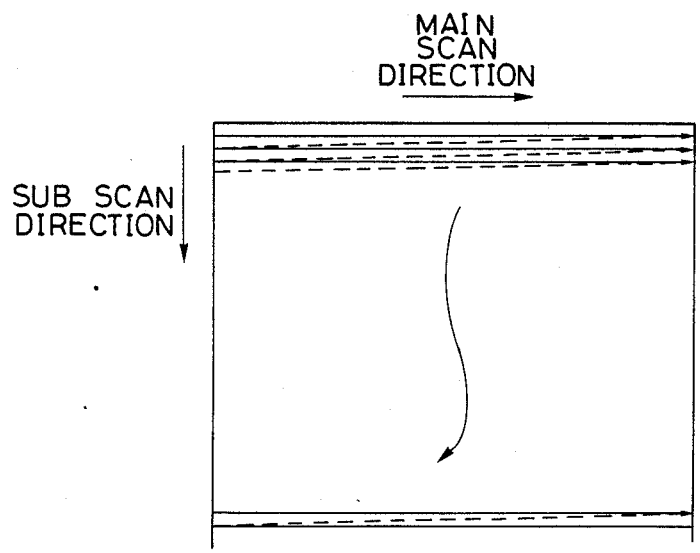

More specifically, the signals obtained by serial scanning as shown in FIG. 1A are converted by a memory into the form obtained by raster scanning as shown in FIG. 1B, then subjected to binary digitizing with the error dispersion method, and again converted inversely by means of a memory. Said conversion will be explained by detail in the following.

Such a process allows the handling of partly jointed image data as a continuous image, and the elimination of the streak formation at the boundary of partial image areas.

In the fifth embodiment, the structures shown in FIGS. 4 to 10 and 12 are the same as those in the first embodiment and will not, therefore, be explained.

Figure 24:
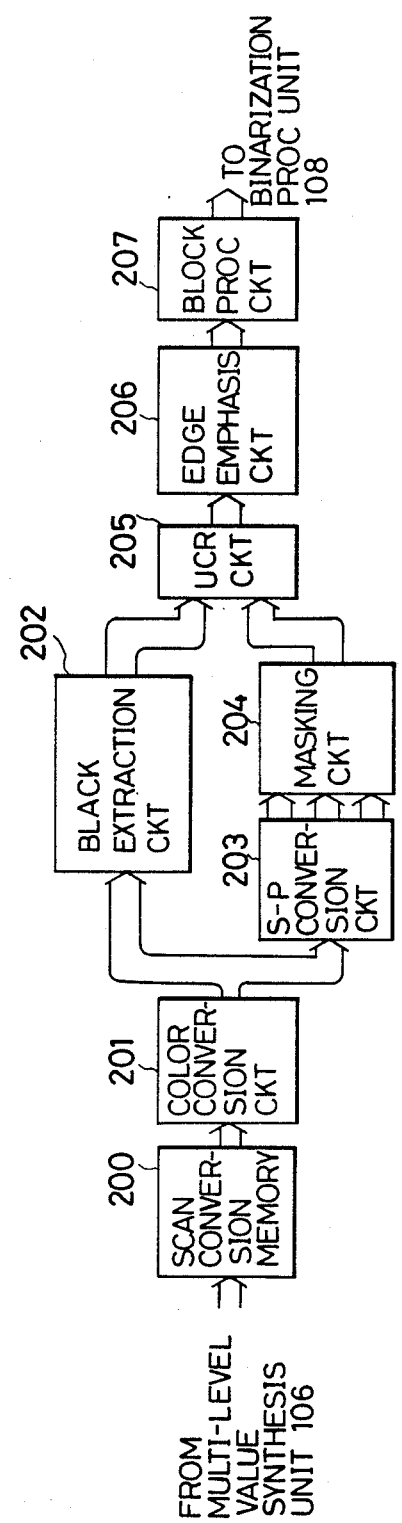
FIG. 24 is a block diagram of the image processing unit 107 in the fifth embodiment.

FIG. 24 is a circuit diagram of the image processing unit 107 shown in FIG. 9, partially modified from the circuit of the first embodiment shown in FIG. 11.

The circuit shown in FIG. 24 is different, in the presence of a scan conversion memory, from that shown in FIG. 11. In FIG. 24, the same components as those in FIG. 11 are represented by the same numbers and will not be explained further.

Referring to FIG. 24, color-sequential multi-value color information of three colors (cyan, magenta and yellow) supplied from the multi-value synthesis unit 106 is subjected, in the scan conversion memory 200, to the conversion of scanning direction, from the form of image signals shown in FIG. 1A to that shown in FIG. 1B.

The scan conversion memory 200 is required to have a capacity at least equal to a scanning operation of the area (a) in FIG. 1A. For achieving a high-speed operation, there may be employed a so-called double buffer system, in which the memory has a capacity corresponding to two scanning operations for the areas (a) and (b), and a half of said memory 200 is used for image data writing while the other half is used for image data reading. Said double buffer system will be explained in more detail later.

Figure 25:
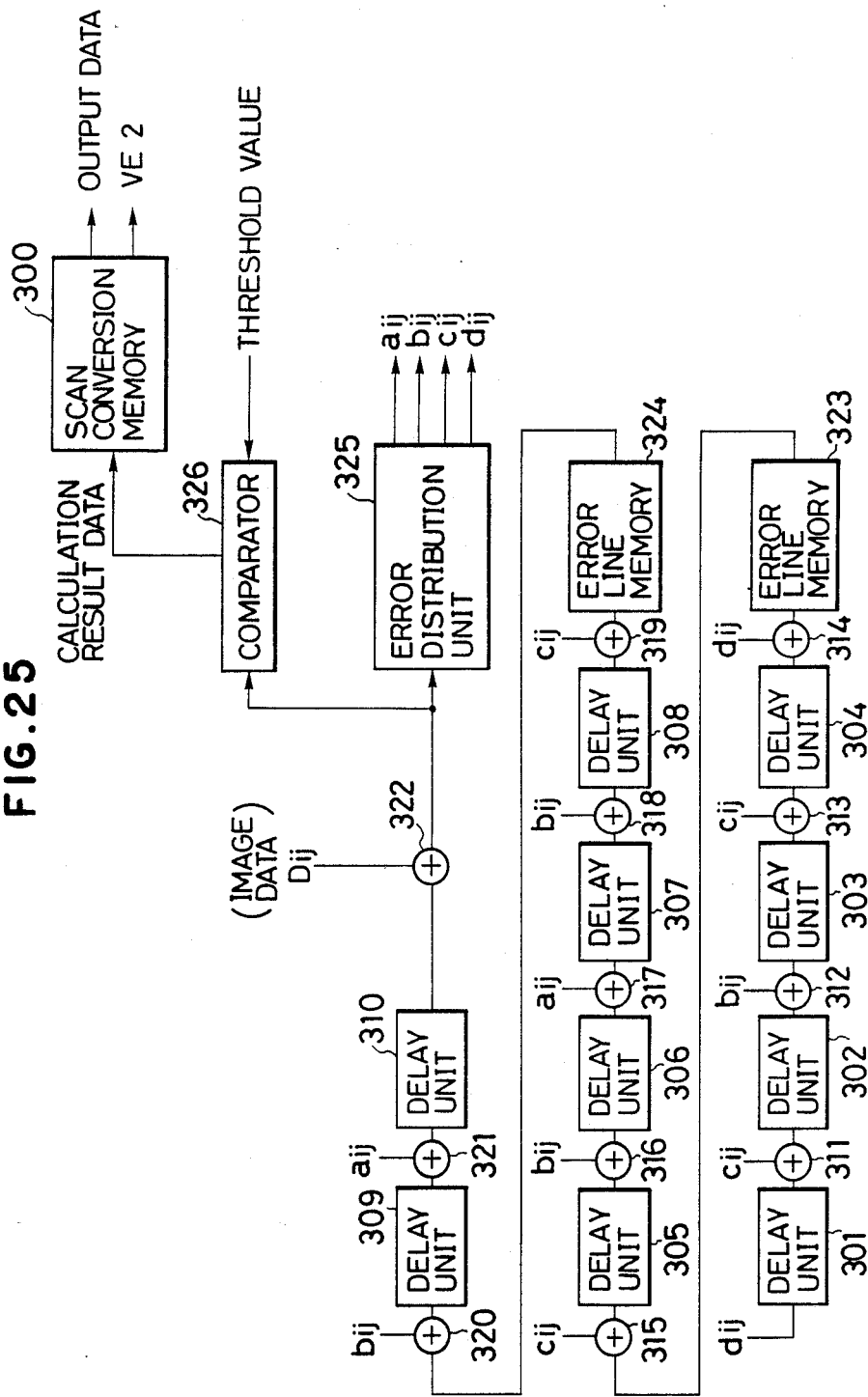
FIG. 25 is a block diagram of the binarizing unit 108 in the fifth embodiment.

FIG. 25 is a circuit diagram of the binary digitizing unit 108 shown in FIG. 9, partially modified from the circuit of the first embodiment shown in FIG. 13A.

In FIG. 25, the AND gate 327 in FIG. 13A is replaced by the scan conversion memory 300. In FIG. 25, the same components as those in FIG. 13A are represented by the same numbers and will not be explained further.

The scan conversion memory 300 performs conversion of scanning direction on the color-sequential multi-value image information of four colors (cyan, magenta, yellow and black) supplied from the comparator 326, from the raster-scanned image signals shown in FIG. 1B to the serial-scanned image signals shown in FIG. 1A. Namely this is a conversion inverse to the conversion executed by the scan conversion memory 200 shown in FIG. 24.

Figure 23:
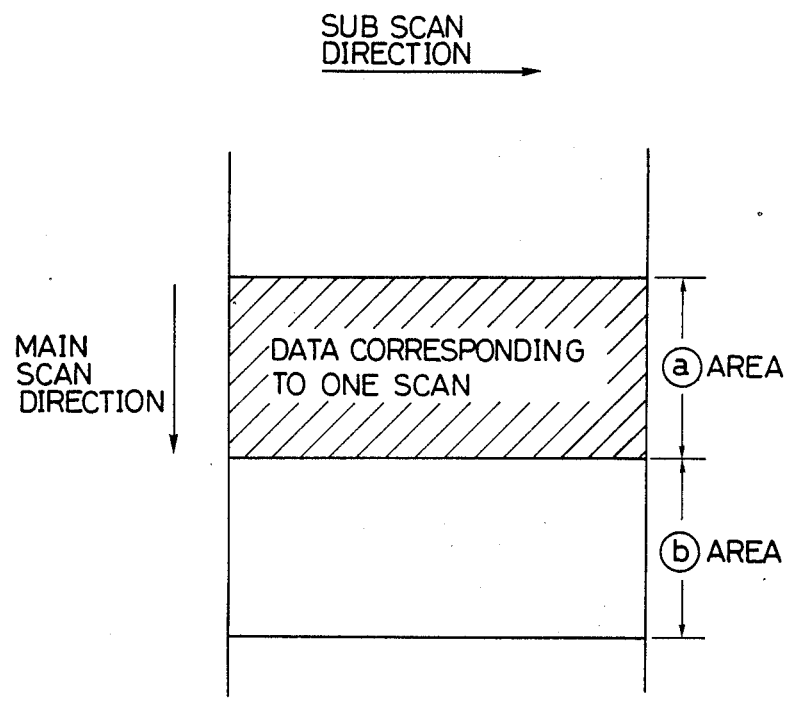
FIG. 23 is a schematic view showing a fifth embodiment.

The scan conversion memory 300 is required to have a capacity at least corresponding to a scanning operation of the area (a) shown in FIG. 23, but, different from the scan conversion memory 200, the memory capacity is reduced despite the increase in the number of colors (black) since it handles binary images. For achieving a high-speed operation, there may be employed, as in the scan conversion memory 200, a called double buffer system in which the memory has a capacity corresponding to two scanning operations for the areas (a) and (b) and a half of the scan conversion memory 300 is used for image data writing while the other half is used for image data reading.

Figure 26:
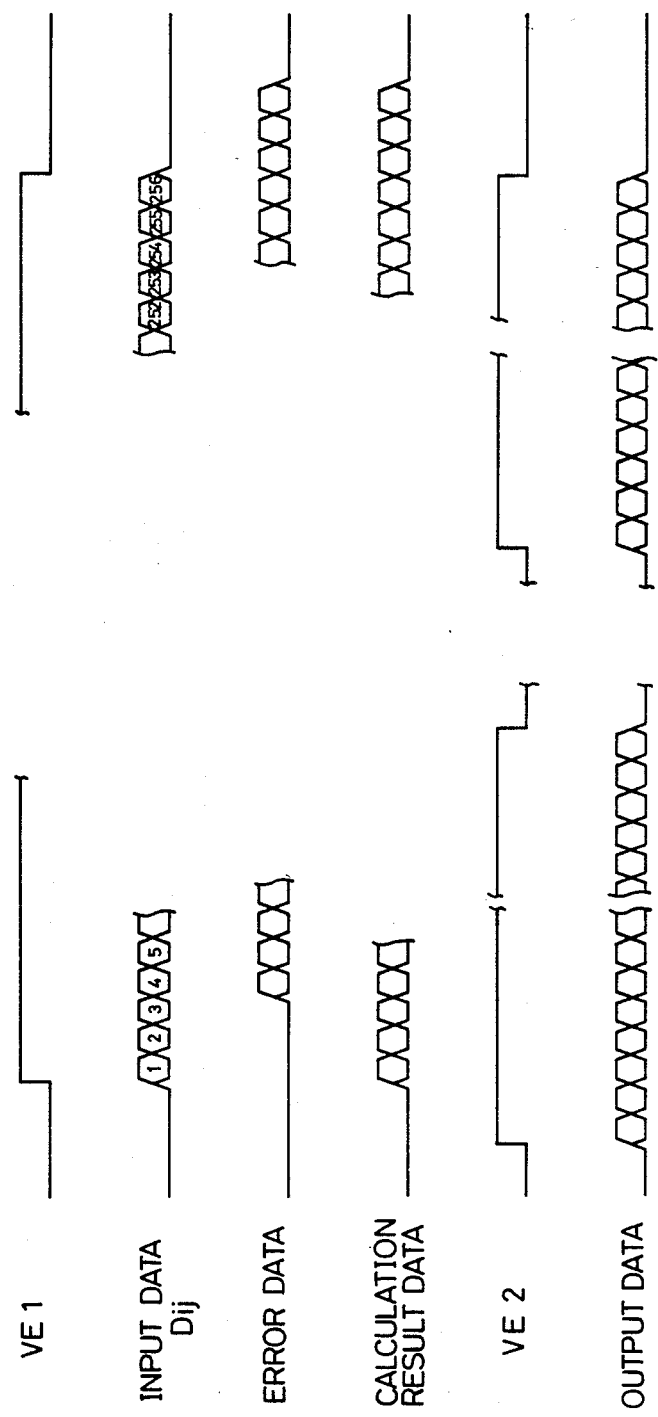
FIG. 26 is a timing chart of the binarizing unit 108 in the fifth embodiment.

In the following, the function of the circuit shown in FIG. 25 will be explained with reference to a timing chart shown in FIG. 26, which shows a case of a single color for each of understanding.

A signal VE1 is the main scanning section signal shown in FIG. 1B. The above-explained function is conducted while the signal VE1 is effective, and the result of processing is stored in the scan conversion memory 300.

A signal VE2 corresponding to the main scanning section signal in FIG. 1A is generated in the scan conversion memory 300 after the conversion of the scanning direction, and the converted binary image data are released, as the illustrated output data, in synchronization with said section signal.

The error data in the boundary of the areas shown in FIG. 1A are stored in the line memories 323, 324, so that no particular consideration is required for such error data.

Figure 27:
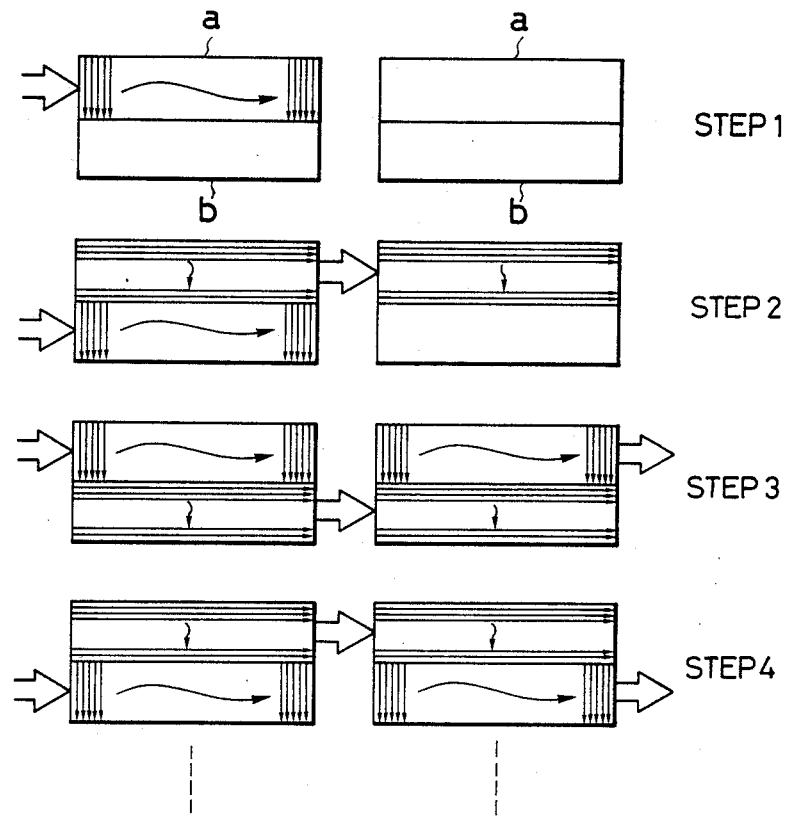
FIG. 27 is a schematic view showing the principle of signal conversion.

Now, reference is made to FIG. 27 for explaining an example of signal conversion in the scan conversion memories 200, 300, each of which is divided into two memory banks a, b as illustrated.

At first, in a step 1, the image data are written in the memory bank a of the scan conversion memory 200. In succeeding steps, the image data are stored alternately in the memory banks a and b.

On the other hand, as shown in the step 2, the signals with converted scanning direction are read in succession from the scan conversion memory 200, and subjected to the binary digitizing explained above, and the binarized image data are written in succession in the scan conversion memory 300.

Then, as shown in the step 3, the binary image signals with the restored scanning direction are released from the scan conversion memory 300.

In this manner the double buffer system enables high-speed scan conversion of the image data.

Though the present fifth embodiment executes scan conversion by means of two scan conversion memories 200, 300, it is also possible to use the scan conversion memory 200 only and to send the scan-converted signals directly, for example, to a laser beam printer for image recording.

As explained in the foregoing, a conversion of scanning direction provides a smooth output image without streaking at the boundary of image areas, thus achieving the object of the present invention.

Also, the present embodiment enables image scanning and image printing in two directions, by changing the sequence of data writing and reading in the memory.

More specifically, in FIG. 8, after the scanning in the area (1), the scanning operation may be continued in the opposite direction instead of returning to the correction area 68, and the obtained signals may be inverted in the scan conversion memory. In this manner image scanning in two directions is rendered possible.

Also, the printing operation in two directions is rendered possible by inverting the signals in the scan conversion memory when the carriage 34 returns in the direction B in FIG. 8.

These operations can be achieved by merely employing an up-down counter for the address control for the signal writing and reading of the scan conversion memory.

Such image scanning or printing in two directions enables a faster copying operation since the time required for returning to the home position can be dispensed with.

Also the formation of a mirror image can be easily achieved by the switching of up-down address control for the data writing and reading.

As explained in the foregoing, the fifth embodiment is capable of preventing streak formation at the boundary of image areas by conducting the error dispersion method after the image data are stored in a memory and are subjected to a scan conversion.

Other embodiments

Figure 28:
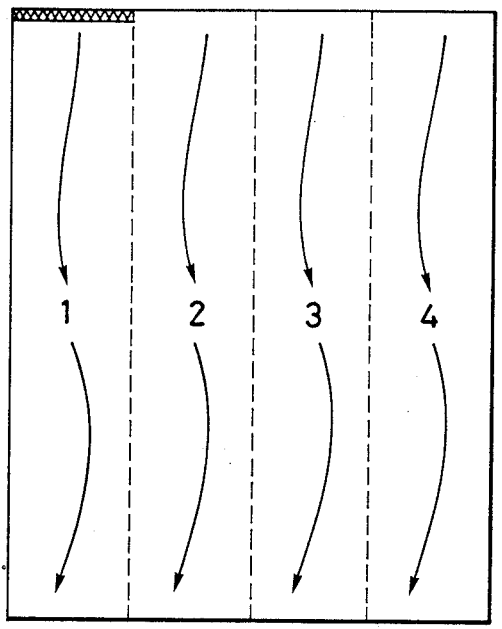
Figure 29:
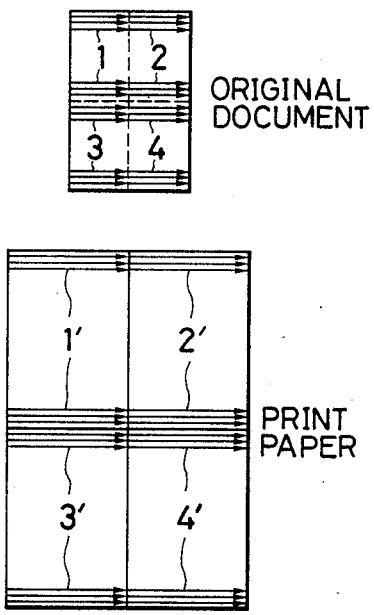

FIGS. 28 to 30 show other examples of image output requiring the jointing information in the execution of the error dispersion method.

FIG. 28 shows a case, in the above-explained copying apparatus, of enlarging the original image and printing the enlarged image, in four divided portions on the rolled sheet 29.

In this example, the image jointing information is required at the broken lines between the output image areas 1, 2, 3, 4 in addition to the image area boundaries explained before. The streak formation at said broken lines can be prevented by the overlapped scanning process explained in the first and third embodiments.

It is also possible to prevent said streak formation in the second and fourth embodiments, by storing, in a memory, the error data generated in the broken line portions among the output image areas 1, 2, 3, 4.

FIG. 29 shows a case of printing an enlarged image of an original on four cut sheets in the copying apparatus explained in the foregoing first to fifth embodiments or in a copying apparatus with a printer such as a laser beam printer.

In this example, the image jointing information is newly required at the broken-line portions intersecting the image areas 1, 2, 3, 4. In such case the streak formation can be prevented in the first and third embodiments, by an overlapped process at all the jointing portions of the image areas.

Also, such streak formation can be prevented in the second and fourth embodiments, by storing, in a memory, the error data of all the jointing portions of the image areas.

FIG. 30 shows image jointing portions in case of an image synthesis with the copying apparatus explained in the foregoing first to fifth embodiments.

Original image areas A, B are copied on a recording sheet with image size changes. In this case, if the copying operation is conducted in the order of A1, B1, A2 and B2, image jointing occurs at the broken-lined boundary on the recording sheet.

In this case, as the copying operation is conducted in the order of A1, B1, A2 and B2, contrary to the cases shown in FIGS. 28 and 29, the streak formation can be prevented by the overlapped process at the boundary between the areas A1 and A2, and at the boundary between the areas B1 and B2.

Also, the second and fourth embodiments are applicable for the prevention of streak formation, by storing, in a memory, the error data at the boundary between the areas A1 and A2 and at the boundary between the areas B1 and B2.

Thus, the present invention can resolve, in the cases shown in FIGS. 28 to 30, the problem of image jointing in the use of the error dispersion method.

In the foregoing embodiments the image data are binary digitized by the error dispersion method, but the present invention is similarly applicable to the case of digitizing into multiple levels.

The present invention has been explained by preferred embodiments thereof, but it is not limited to such embodiments and is subject to various modifications within the scope and spirit of the appended claims.

What is claimed is:

1. An image processing apparatus comprising:
reading means for reading an image by dividing the image into plural areas, and for providing image data; and
process means for performing a quantization process on the image data obtained from said reading means to obtain record data to be used in a recording,
wherein said process means performs, in the recording, a quantization process of the image data to give continuity to the plural areas read by said reading means.

2. An apparatus according to claim 1, wherein said process means performs the quantization process of the image data to obtain binary data as the record data in an error dispersion method.

3. An image processing apparatus according to claim 2, wherein said process means comprises memory means for storing error data from an area preceding an object area, and is adapted, in the quantizing of the image data of said object area, to conduct the quantizing based on the error data stored in said memory means, said error data being generated in the quantizing of the image data.

4. An image processing apparatus according to claim 3, wherein said process means is further adapted to conduct the quantizing of the image data of an area succeeding to the object area in an overlapped manner.

5. An image processing apparatus according to claim 2, wherein said process means is adapted, in the quantizing of the image data by the error dispersion method, to conduct the quantizing with a matrix that does not distribute errors from an object area to a preceding area.

6. An image processing apparatus according to claim 1, wherein said process means is adapted, in quantizing the image data of an object area, to quantize the image data of a preceding area in an overlapped manner.

7. An image processing apparatus according to claim 6, wherein said process means is adapted, in quantizing the image data of an object area, to quantize the image data of preceding and succeeding areas in the overlapped manner.

8. An image processing apparatus according to claim 1, further comprising memory means for storing the image data of at least one of said plural areas, wherein said process means is adapted to quantize the image data stored in said memory means.

9. An apparatus according to claim 1, further comprising record means for performing the recording of an image using an ink-jet method, on the basis of the record data obtained by said process means.

10. An image processing apparatus comprising:
reading means for reading an image by dividing the image into plural areas, and for providing image data;
process means for performing a quantization process on the image data obtained by said reading means to obtain record data to be used in a recording; and
memory means for storing information of a jointing portion of the plural areas,
wherein said process means performs the quantization process to obtain the record data from the information stored in said memory means and the image data at the jointing portion.

11. An apparatus according to claim 10, wherein said process means performs the quantization process of the image data to obtain binary data as the record data in an error dispersion method.

12. An image processing apparatus according to claim 10, wherein said memory means is adapted to store information of an area preceding an object area to be processed by said process means.

13. An image processing apparatus according to claim 12, wherein the information stored in said memory means is error data generated in the quantizing of the image data by an error dispersion method.

14. An image processing apparatus according to claim 13, wherein said process means is adapted to conduct quantizing based on error data from an area preceding the object area, stored in the memory means, and on the image data of said object area.

15. An apparatus according to claim 10, further comprising record means for performing the recording of an image using an ink-jet method, on the basis of the record data obtained by said process means.

16. An image processing apparatus comprising:
reading means for reading an image by dividing the image into plural areas, and for providing image data; and
process means for performing a quantization process on the image data obtained from said reading means to obtain record data to be used in a recording;
wherein said reading means reads the image data of an area neighboring an object area to be processed by said process means, in an overlapping manner, and
wherein said process means performs the quantization process of the image data read by said reading means in the overlapping manner to obtain the record data.

17. An image processing apparatus according to claim 16, further comprising means for extracting the image data of the object area, from the image data digitized by said process means.

18. An image processing apparatus according to claim 16, wherein said reading means is adapted to read, in the overlapped manner, a part of the image data of an area preceding said object area.

19. An image processing apparatus according to claim 16, wherein said reading means is adapted to read, in the overlapped manner, a part of the image data of an area succeeding to said object area.

20. An apparatus according to claim 16, wherein said process means performs the quantization process on the image data to obtain binary data as the record data in an error dispersion method.

21. An apparatus according to claim 16, further comprising record means for performing the recording of an image using an ink-jet method, on the basis of the record data obtained by said process means.

22. An image processing apparatus comprising:
reading means for reading an image by dividing the image into plural areas, and for providing image data;
process means for performing a quantization process on the image data obtained from said reading means to obtain record data to be used in a recording; and
memory means for storing information of a jointing portion of the plural areas,
wherein said reading means reads the image data of an area neighboring an object area to be processed by said process means, in an overlapping manner, and
wherein said process means performs the quantization process on the information stored in said memory means and the image data read by said reading means in the overlapping manner, into the record data.

23. An apparatus according to claim 22, wherein said process means performs the quantization process on the image data to obtain binary data as the record data in an error dispersion method.

24. An image processing apparatus according to claim 22, wherein said memory means is adapted to store information of an area preceding an object area to be processed by said process means.

25. An image processing apparatus according to claim 24, wherein the information stored in said memory means is error data generated in the quantizing of the image data by an error dispersion method.

26. An image processing apparatus according to claim 22, further comprising means for extracting the image data of an object area, from the image data quantized by said process means.

27. An image processing apparatus according to claim 22, wherein said reading means is adapted to read, in the overlapped manner, a part of the image data of an area succeeding an object area.

28. An image processing apparatus according to claim 22, wherein said process means is adapted to conduct the quantizing, in a jointing portion between an object area and a preceding area, based on the information stored in said memory means and the image data, and, in a jointing portion between the object area and a succeeding area, on the image data obtained in the overlapping reading.

29. An apparatus according to claim 22, further comprising record means for performing the recording of an image using an ink-jet method, on the basis of the record data obtained by said process means.

30. An image processing apparatus comprising:
reading means for reading an image by dividing the image into plural areas, and for providing image data; and
process means for digitizing the image data from said reading means,
wherein said process means is adapted, in digitizing of the image data, to give continuity to the plural areas read by said reading means, and
wherein said process means is adapted to digitize the image data into binary data by an error dispersion method.

31. An apparatus according to claim 30, wherein said process means is adapted, in digitizing the image data of an object area, to digitize image data of a preceding area in an overlapping manner.

32. An apparatus according to claim 31, wherein said process means is adapted, in digitizing the image data of the object area, to digitize image data of preceding and succeeding areas in the overlapping manner.

33. An apparatus according to claim 30, wherein said process means comprises memory means for storing error data from an area preceding an object area, and is adapted, in the digitizing of the image data of the object area, to conduct the digitizing based on the error data stored in said memory means.

34. An apparatus according to claim 33, wherein said process means is further adapted to conduct the digitizing of the image data of an area succeeding the object area in an overlapping manner.

35. An apparatus according to claim 30, wherein said process means is adapted, in the digitizing of the image data by the error dispersion method, to conduct the digitizing with a matrix that does not distribute errors from the object area to a preceding area.

36. An apparatus according to claim 30, further comprising memory means for storing the image data of at least one of the plural areas, and wherein said process means is adapted to digitize the image data stored in said memory means.

37. An apparatus according to claim 30, further comprising record means which performs an image recording in an ink-jet manner, on the basis of the binary data obtained by said process means.

38. An image processing apparatus comprising:
reading means for reading an image by dividing the image into plural areas, and for providing image data; and
process means for digitizing the image data from said reading means,
wherein said process means is adapted, in digitizing of the image data, to give continuity to the plural areas read by said reading means; and
wherein said process means is adapted, in digitizing the image data of an object area, to digitize image data of preceding and succeeding areas in an overlapping manner.

39. An apparatus according to claim 38, further comprising record means which performs an image recording in an ink-jet manner, on the basis of the data digitized by said process means.

40. An image processing apparatus comprising:
reading means for reading an image by dividing the image into plural areas, and for providing image data;
process means for digitizing the image data from said reading means; and
memory means for storing information of a jointing portion of the plural areas,
wherein said process means is adapted, in the jointing portion of the plural areas, to conduct the digitizing based on the information stored in said memory means and on the image data, and
wherein said process means is adapted to digitize the image data into binary data by an error dispersion method.

41. An apparatus according to claim 40, wherein said memory means is adapted to store information of an area preceding an object area to be processed by said process means.

42. An apparatus according to claim 41, wherein the information stored in said memory means comprises error data generated in the digitizing of the image data by the error dispersion method.

43. An apparatus according to claim 42, wherein said process means is adapted to conduct the digitizing based on the error data from the area preceding the object area, stored in said memory means, and on the image data of the object area.

44. An apparatus according to claim 40, further comprising record means which performs an image recording in an ink-jet manner, on the basis of the binary data obtained by said process means.

45. An image processing apparatus comprising:
reading means for reading an image by dividing the image into plural areas, and for providing image data;
process means for digitizing the image data from said reading means; and
memory means for storing information of a jointing portion of the plural areas,
wherein said process means is adapted, in the jointing portion of the plural areas, to conduct the digitizing based on the information stored in said memory means and on the image data, and
wherein said memory means is adapted to store the information of an area preceding an object area to be processed by said process means, and the information stored in said memory means is error data generated by digitizing the image data using an error dispersion method.

46. An apparatus according to claim 45, wherein said process means is adapted to conduct the digitizing based on the error data from an area preceding the object area, stored in said memory means, and on the image data of the object lens.

47. An image processing apparatus comprising:
reading means for reading an image by dividing the image into plural areas, and for providing image data; and
process means for digitizing the image data from said reading means,
wherein said reading means is adapted to read the image data of an area neighboring an object area to be processed by said process means in an overlapping manner, and
wherein said process means is adapted to digitize the image data read in the overlapping manner, and
wherein said process means is adapted to digitize the image data into binary data using an error dispersion method.

48. An apparatus according to claim 47, further comprising means for extracting image data of the object area from the image data digitized by said process means.

49. An apparatus according to claim 47, wherein said reading means is adapted to read, in the overlapping manner, a part of the image data of an area preceding the object area.

50. An apparatus according to claim 47, wherein said reading means is adapted to read, in the overlapping manner, a part of the image data of an area succeeding the object area.

51. An apparatus according to claim 47, further comprising record means which performs an image recording in an ink-jet manner, on the basis of binary data obtained by said processing means.

52. An image processing apparatus comprising:
reading means for reading an image by dividing the image into plural areas, and for providing image data;
process means for digitizing the image data from said reading means; and
memory means for storing information of a jointing portion of the plural areas;
wherein said reading means is adapted to read, in an overlapping manner, the image data of an area neighboring the object area to be processed by said process means, and wherein said process means is adapted to conduct digitizing based on the information stored in said memory means and the image data in the overlapping manner, and wherein said process means is adapted to digitize the image data into binary data by an error dispersion method.

53. An apparatus according to claim 52, wherein said memory means is adapted to store information of an area preceding the object area to be processed by said process means.

54. An apparatus according to claim 53, wherein the information stored in said memory means is error data generated in the digitizing of the image data by the error dispersion method.

55. An apparatus according to claim 52, further comprising means for extracting the image data of the object area, from the image data digitized by said process means.

56. An apparatus according to claim 52, wherein said reading means is adapted to read, in the overlapping manner, a part of the image data of an area succeeding the object area.

57. An apparatus according to claim 52, wherein said process means is adapted to conduct the digitizing, in a jointing portion between the object area and a preceding area, based on the information stored in said memory means and the image data, and, in the jointing portion between the object area and a succeeding area, on the image data obtained in the overlapping reading.

58. An apparatus according to claim 52, further comprising record means which performs an image recording in an ink-jet manner, on the basis of the binary data obtained by said process means.

59. An image processing apparatus comprising:
reading means for reading an image by dividing the image into plural area, and for providing image data;
a memory for storing the image data of the plural areas obtained from said reading means;
means for reading the image data stored in said memory in a sequence different from a sequence of storage in said memory; and
process means for digitizing the image data read from said memory,
wherein said process means is adapted to digitize the image data into binary data by an error dispersion method.

60. An apparatus according to claim 59, further comprising a second memory for storing the image data digitized by said process means.

61. An apparatus according to claim 59, further comprising record means which performs an image recording in an ink-jet manner, on the basis of the binary data obtained by said process means.

62. An image processing method comprising:

a reading step of reading an image by dividing the image into plural areas, and providing image data; and a process step of digitizing the image data obtained in said reading step, wherein said process step is adapted, in the digitizing of the image data, to give continuity to the plural areas read in said reading step, and wherein said process step is adapted to digitize the image data into binary data by an error dispersion method.

63. A method according to claim 62, wherein said process step is adapted, in the digitizing of the image data of an object area, to digitize the image data of a preceding area in an overlapping manner.

64. A method according to claim 62, wherein said process step is adapted, in the digitizing of the image data of an object area, to digitize the image of preceding and succeeding areas in an overlapping manner.

65. A method according to claim 62, wherein said process step utilizes memory means for storing error data from an area preceding the object area, and is adapted, in the digitizing of the image data of the object area, to conduct the digitizing based on the error data stored in the memory means.

66. A method according to claim 65, wherein said process step is further adapted to conduct the digitizing of the image data of an area succeeding the object area in an overlapping manner.

67. A method according to claim 62, wherein said process step is adapted, in the digitizing of the image data by the error dispersion method, to conduct the digitizing with a matrix that does not distribute errors from an object area to a preceding area.

68. A method according to claim 62, wherein said process step further utilizes memory means for storing the image data of at least one of the plural areas, and is adapted to digitize the image data stored in the memory means.

69. A method according to claim 62, wherein said process step utilizes record means which performs an image recording in an ink-jet manner, on the basis of the binary data obtained by said process step.

70. An image processing apparatus comprising:
reading means for reading an image by dividing the image into plural areas, and for providing image data;
process means for performing a quantizing of the image data obtained from said reading means into record data to be used in an image recording; and
record means for performing image recording in an ink-jet manner, based on the record data obtained by said process means,
wherein said process means performs, in a case where the image recording is performed by said record means, the quantizing of image data so as to give continuity to the plural areas by said reading means.

* * * * *

UNITED STATES PATENT AND TRADEMARK OFFICE
CERTIFICATE OF CORRECTION

PATENT NO. : 4,958,236          Page 1 of 2

DATED : September 18, 1990

INVENTOR(S) : Nao NAGASHIMA, ET AL.

It is certified that error appears in the above-identified patent and that said Letters Patent is hereby corrected as shown below:

COLUMN 1:

Line 41, "an image," should read --a screentone image--.

COLUMN 5:

Line, 55, "capable processing of" should read --capable of processing--.

COLUMN 7:

Line 35, "sensor 41" should read --sensor 41.--; and

Line 56, "temera-" should read --tempera--.

COLUMN 8:

Line 42, "is" (second occurrence) should read --in--.

COLUMN 13:

Line 21, "to" should be deleted.

UNITED STATES PATENT AND TRADEMARK OFFICE
CERTIFICATE OF CORRECTION

PATENT NO. : 4,958,236

DATED : September 18, 1990

INVENTOR(S) : Nao NAGASHIMA, ET AL.

It is certified that error appears in the above-identified patent and that said Letters Patent is hereby corrected as shown below:

<u>COLUMN 16</u>:

Line 54, "tha" should read --the--.

<u>COLUMN 21</u>:

Line 3, "by" should read --in--.

<u>COLUMN 22</u>:

Line 2, "each" should read --ease--.

<u>COLUMN 24</u>:

Line 45, "6," should read --5,--.

<u>COLUMN 26</u>:

Line 10, "into" should read --to obtain--; and

Signed and Sealed this

Fourteenth Day of May, 1991

*Attest:*

HARRY F. MANBECK, JR.

*Attesting Officer*      *Commissioner of Patents and Trademarks*